US009128250B2

(12) United States Patent
Charters et al.

(10) Patent No.: US 9,128,250 B2
(45) Date of Patent: Sep. 8, 2015

(54) OPTICAL SYSTEMS FOR INFRARED TOUCH SCREENS

(75) Inventors: Robert Bruce Charters, Australian Capital Territory (AU); Dax Kukulj, Australian Capital Territory (AU); Warwick Todd Holloway, Australian Capital Territory (AU); Duncan Ian Ross, Australian Capital Territory (AU); Graham Roy Atkins, Australian Capital Territory (AU)

(73) Assignee: ZETTA RESEARCH AND DEVELOPMENT LLC—RPO SERIES, Wilmington, DE (US)

( * ) Notice: Subject to any disclaimer, the term of this patent is extended or adjusted under 35 U.S.C. 154(b) by 233 days.

(21) Appl. No.: 13/698,822

(22) PCT Filed: May 23, 2011

(86) PCT No.: PCT/AU2011/000606
§ 371 (c)(1),
(2), (4) Date: Nov. 19, 2012

(87) PCT Pub. No.: WO2011/143719
PCT Pub. Date: Nov. 24, 2011

(65) Prior Publication Data
US 2013/0156376 A1 Jun. 20, 2013

Related U.S. Application Data

(60) Provisional application No. 61/347,330, filed on May 21, 2010.

(51) Int. Cl.
*G02B 6/35* (2006.01)
*G02B 6/32* (2006.01)
*G02B 6/10* (2006.01)
*G02B 6/34* (2006.01)
*G02B 6/122* (2006.01)
(Continued)

(52) U.S. Cl.
CPC *G02B 6/34* (2013.01); *G02B 6/122* (2013.01); *G02B 6/26* (2013.01); *G02B 6/4298* (2013.01); *G02B 6/10* (2013.01); *G02B 6/4206* (2013.01); *G02B 6/4214* (2013.01); *G06F 3/0421* (2013.01); *G06F 2203/04104* (2013.01)

(58) Field of Classification Search
CPC .............. G02B 6/10; G02B 6/26; G02B 6/34; G02B 6/122; G02B 6/4206; G02B 6/4214; G02B 6/4219; G06F 2203/04104; G06F 3/0421
USPC ........... 385/31, 33, 36, 42, 129–130, 14, 132; 345/176
See application file for complete search history.

(56) References Cited

U.S. PATENT DOCUMENTS 3,478,220 A 11/1969 Milroy
3,764,813 A 10/1973 Clement et al.
(Continued)

FOREIGN PATENT DOCUMENTS

EP 0660157 A1 6/1995
WO 2010048679 A1 5/2010

OTHER PUBLICATIONS

International Search Report received in International Application No. PCT/AU2011/000606 dated Aug. 5, 2011.

*Primary Examiner* — Akm Enayet Ullah
*Assistant Examiner* — Michael Mooney
(74) *Attorney, Agent, or Firm* — Mattingly & Malur, PC

(57) ABSTRACT

We present optical systems suitable for focusing two substantially collimated beams or sheets of light propagating in different directions onto a common focal point. In some embodiments the optical systems comprise separate focusing elements for each beam or sheet of light, while in other embodiments the optical systems comprise a focusing element and a redirection element. The optical systems have particular application in the receive optics of infrared touch screens, where they enable the detection of additional light paths that assist in the determination of two or more simultaneous touch events.

5 Claims, 31 Drawing Sheets

(51) Int. Cl.
  *G02B 6/26* (2006.01)
  *G02B 6/42* (2006.01)
  *G06F 3/042* (2006.01)

(56) References Cited

U.S. PATENT DOCUMENTS

| | | |
|---|---|---|
| 5,414,413 A | 5/1995 | Tamaru et al. |
| 5,608,745 A | 3/1997 | Hall et al. |
| 5,914,709 A | 6/1999 | Graham et al. |
| 6,856,259 B1 | 2/2005 | Sharp |
| 7,166,966 B2 | 1/2007 | Naugler, Jr. et al. |
| 2002/0163648 A1 | 11/2002 | Degertekin et al. |
| 2006/0001651 A1 | 1/2006 | Weng et al. |
| 2006/0033016 A1 | 2/2006 | Ogawa et al. |
| 2006/0097991 A1 | 5/2006 | Hotelling et al. |
| 2006/0227120 A1 | 10/2006 | Eikman |
| 2006/0284874 A1 | 12/2006 | Wilson |
| 2008/0029691 A1 | 2/2008 | Han |
| 2008/0055267 A1 | 3/2008 | Wu et al. |
| 2008/0278460 A1 | 11/2008 | Arnett et al. |

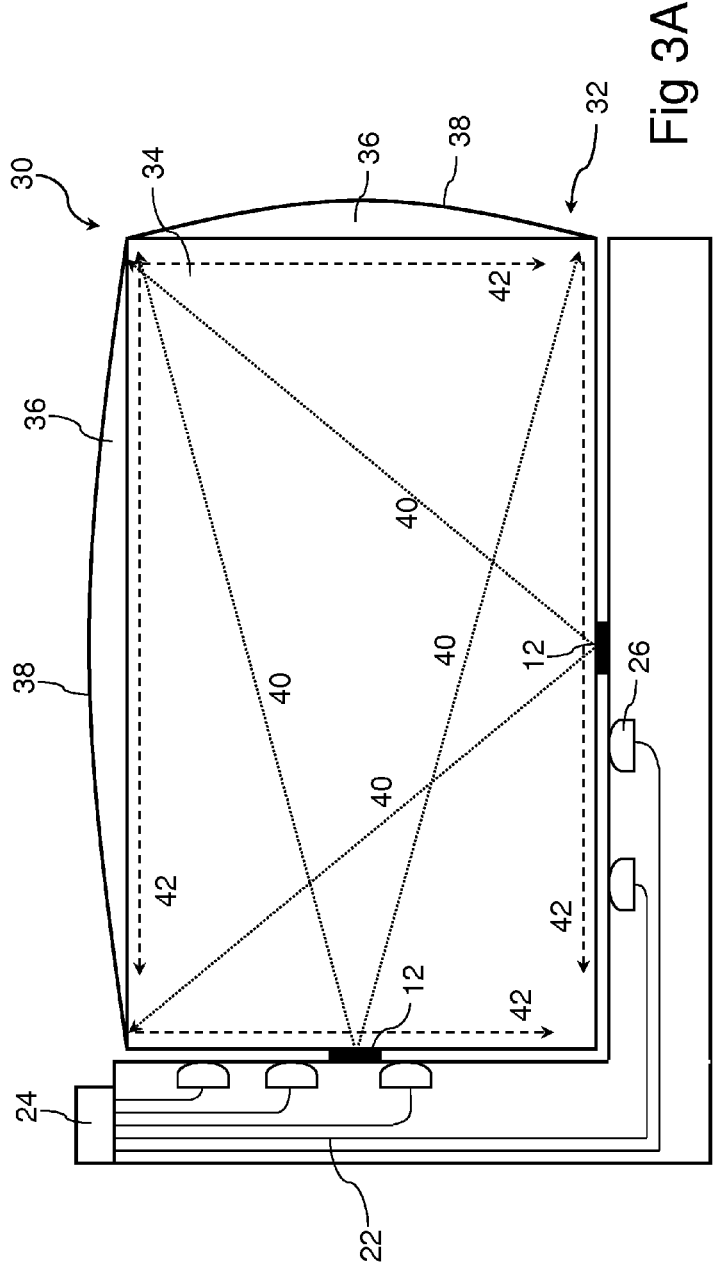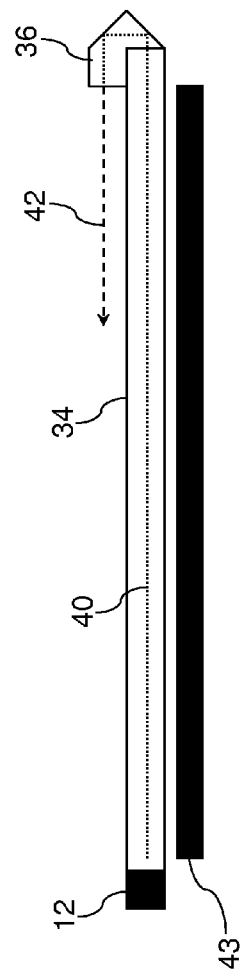
Fig 3A
PRIOR ART
Fig 3B
PRIOR ART

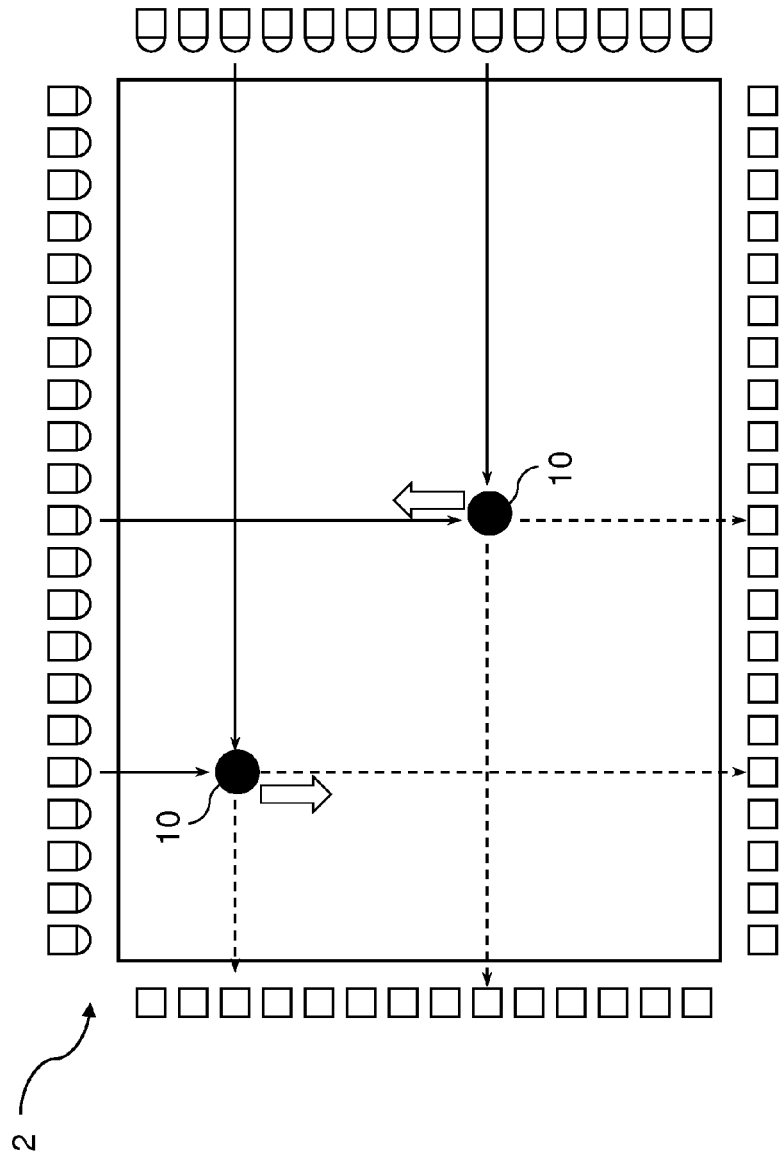

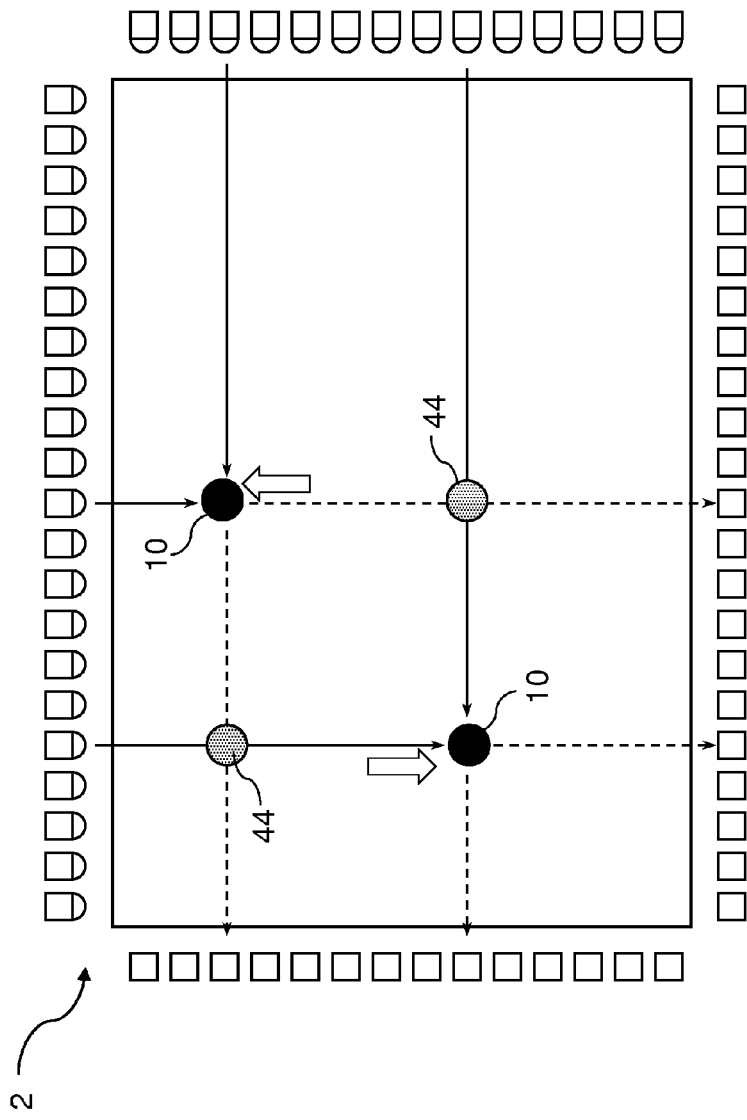

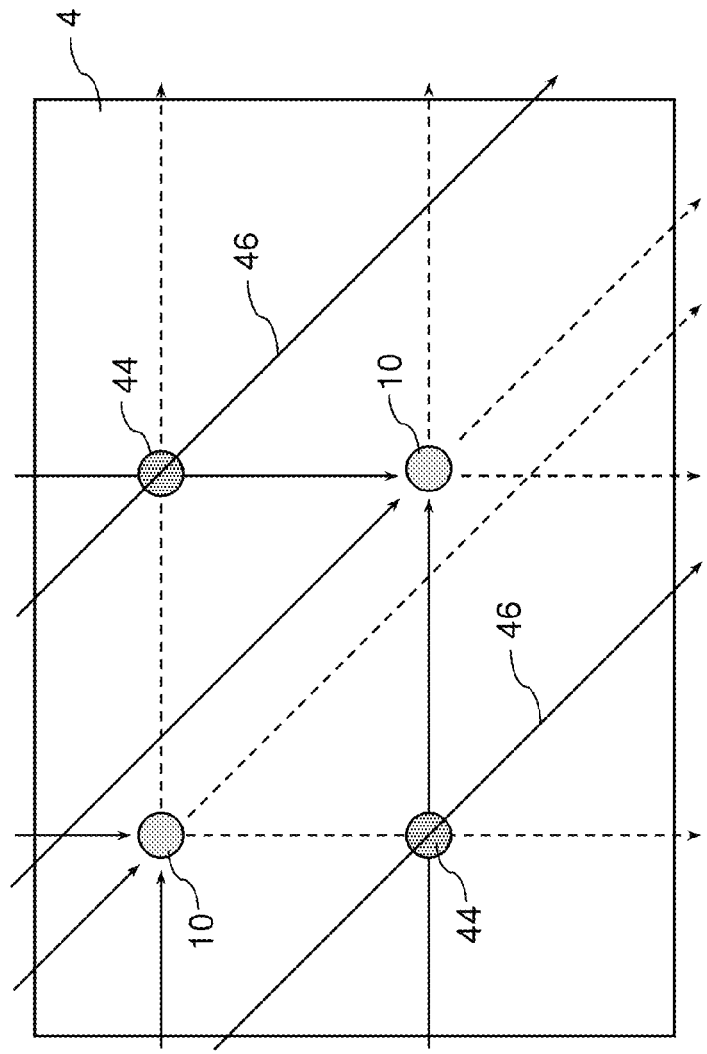

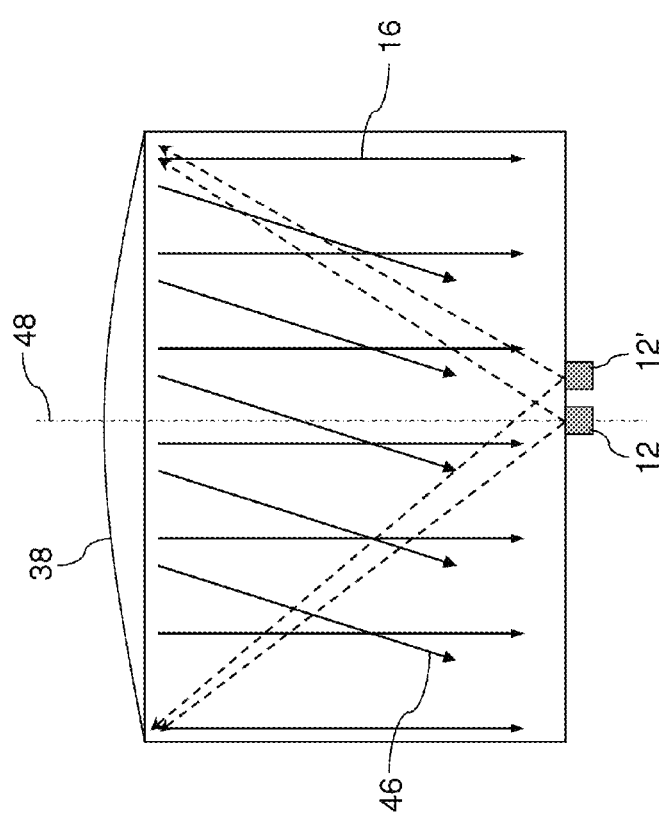

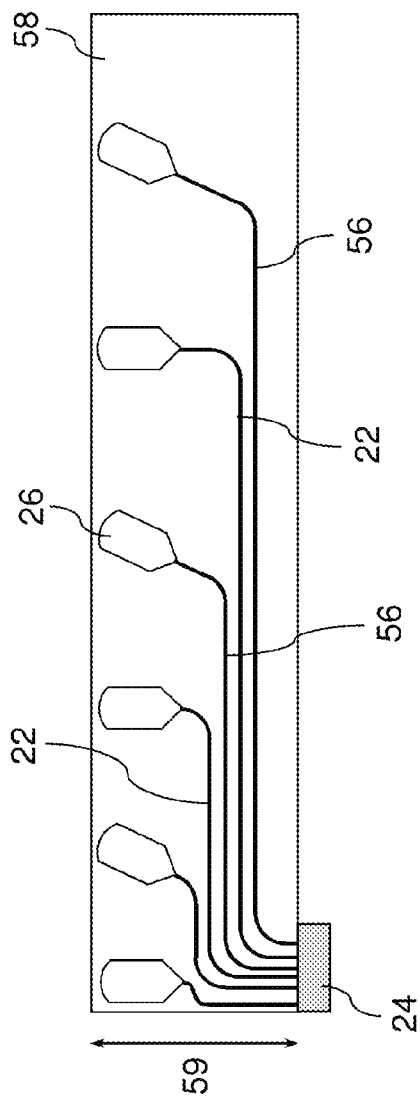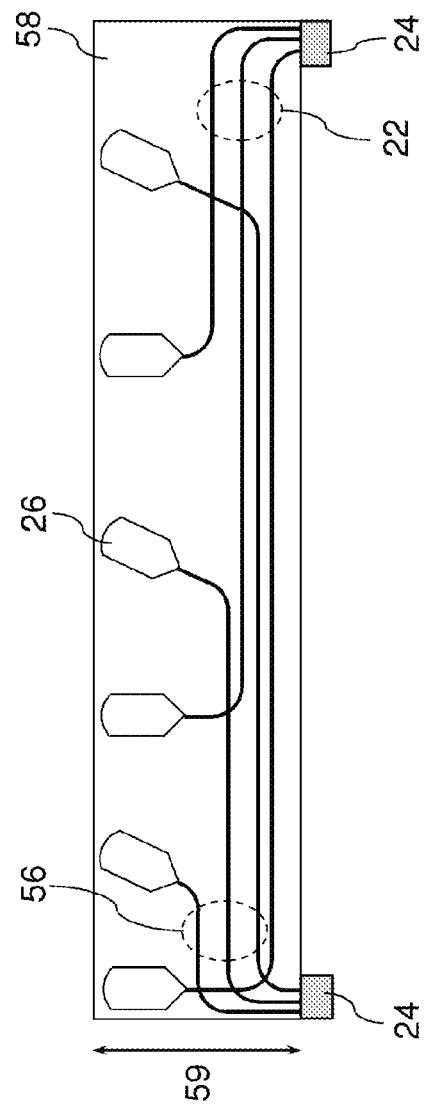

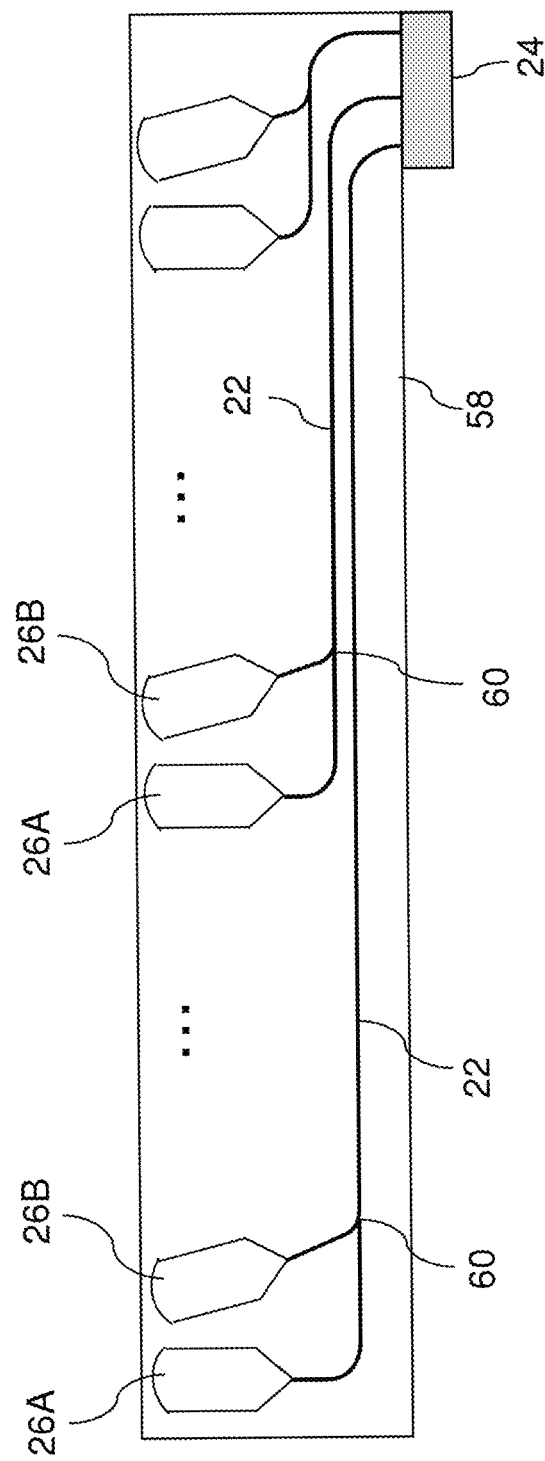

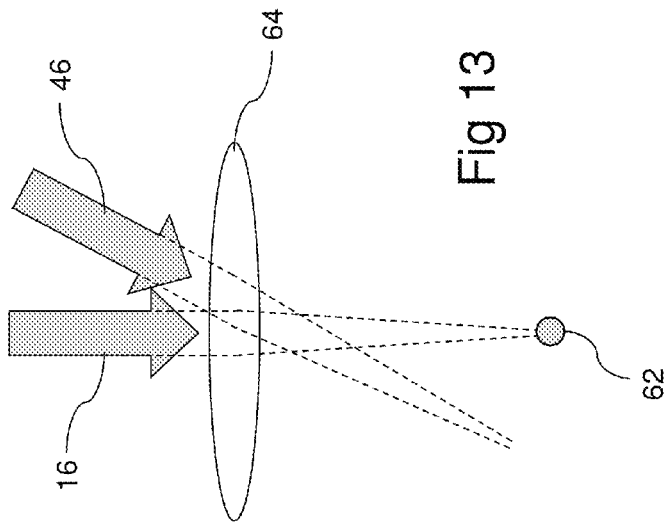
Fig 13
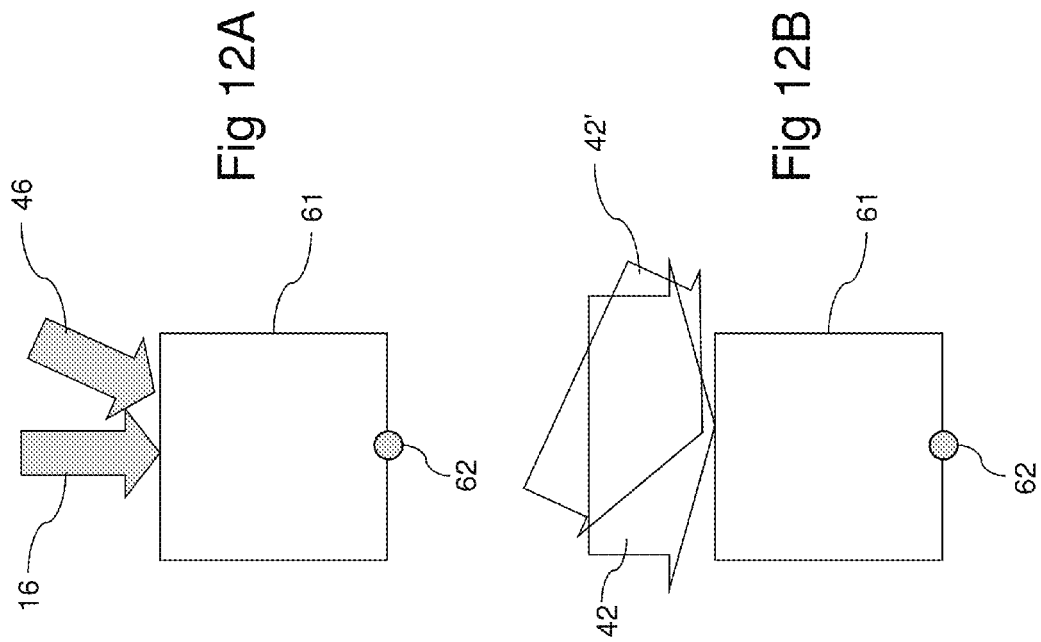
Fig 12A
Fig 12B

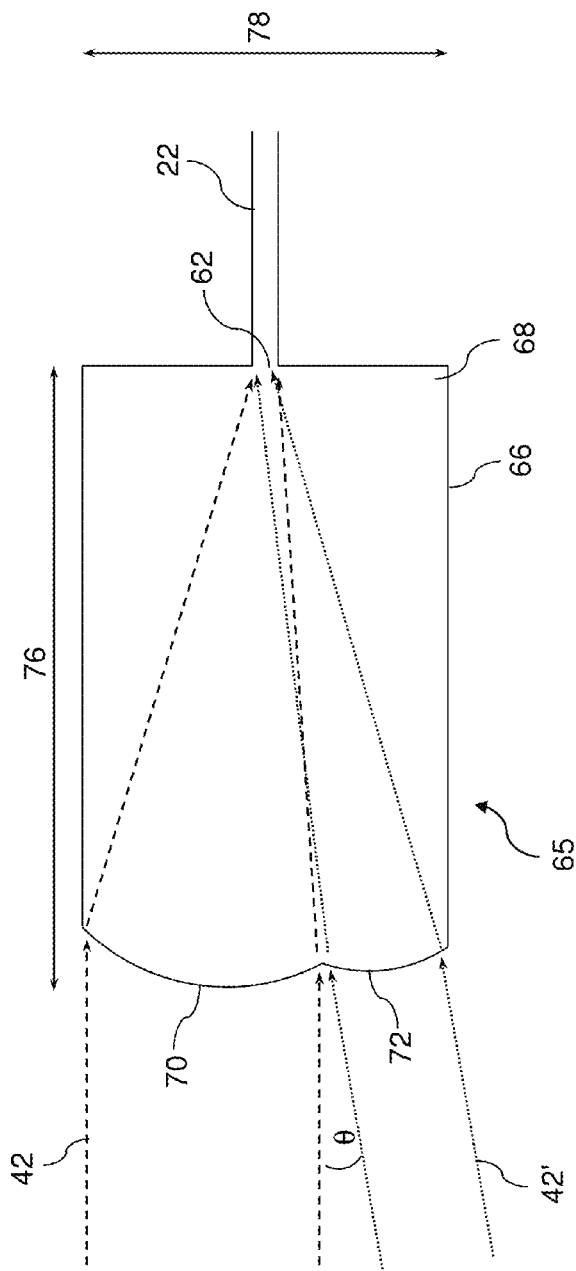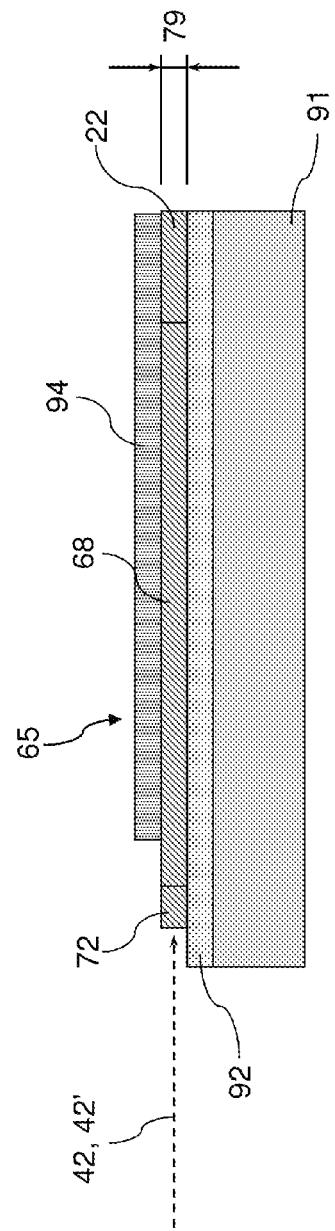
Fig 14A
Fig 14B

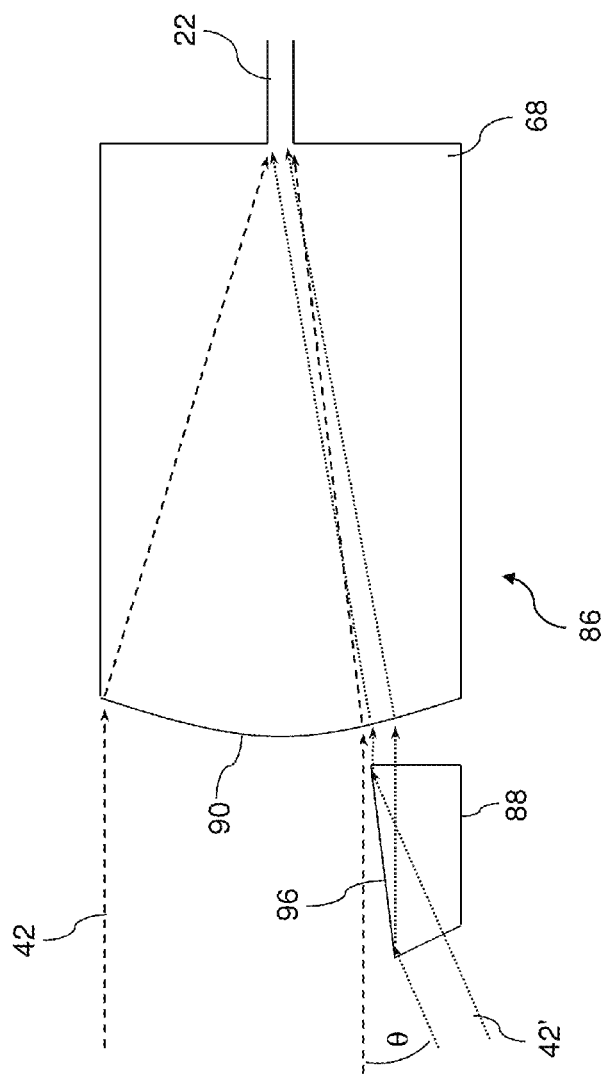
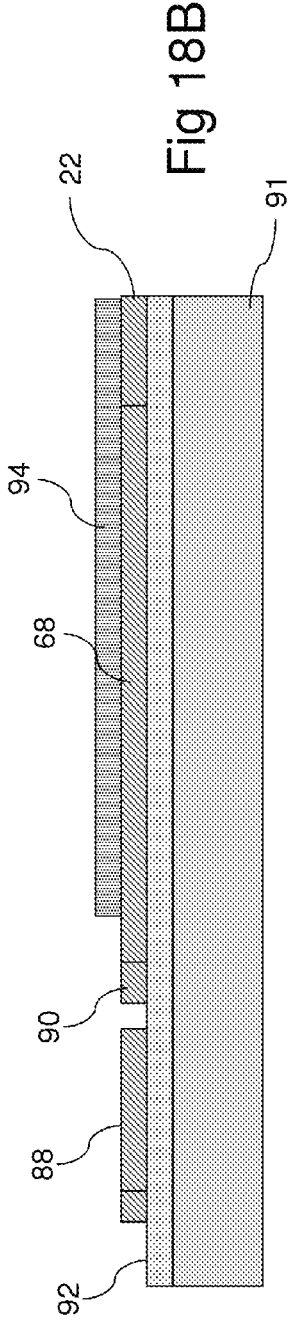

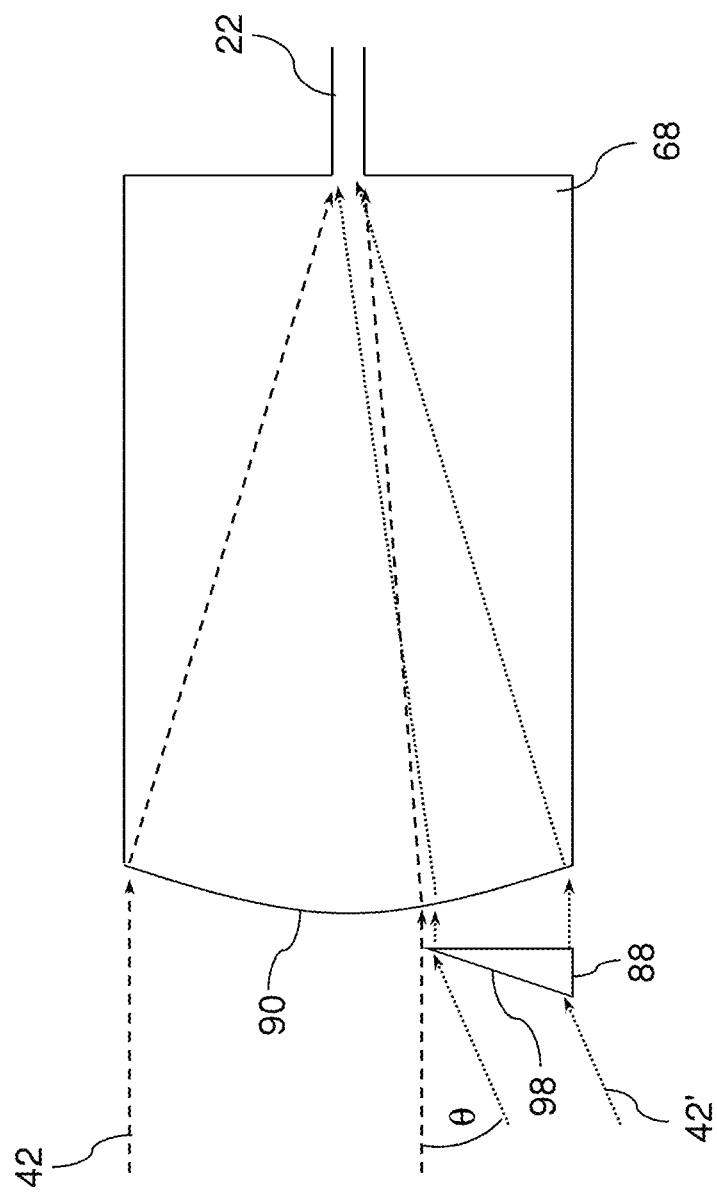

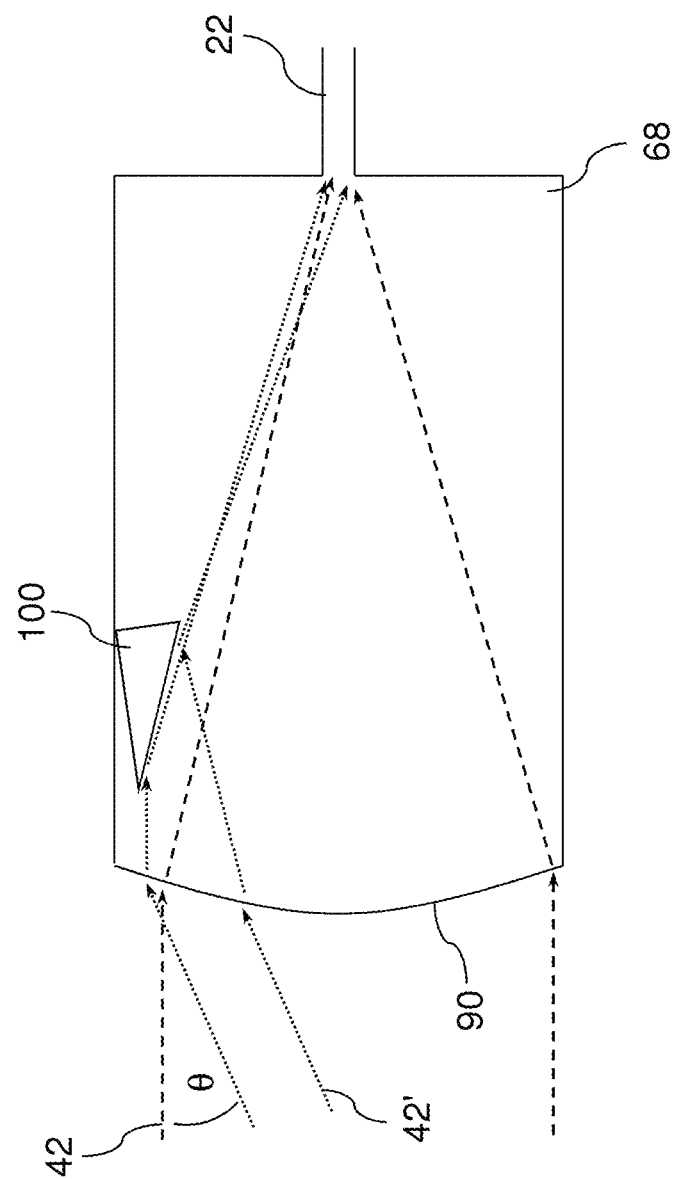

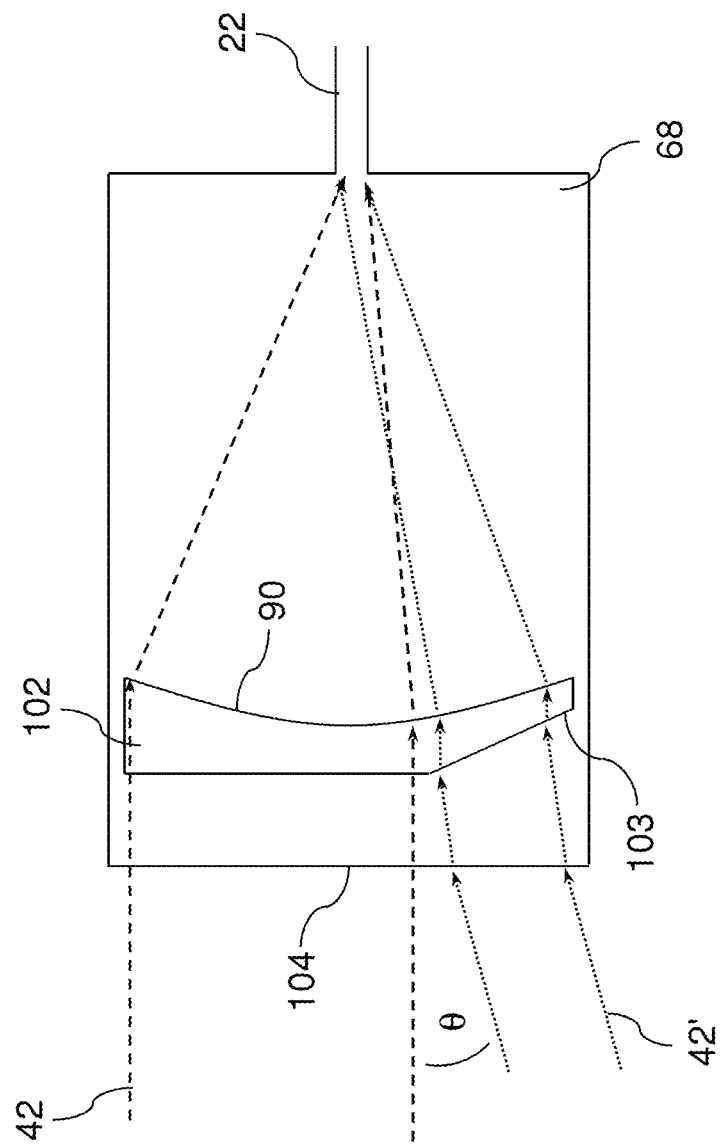

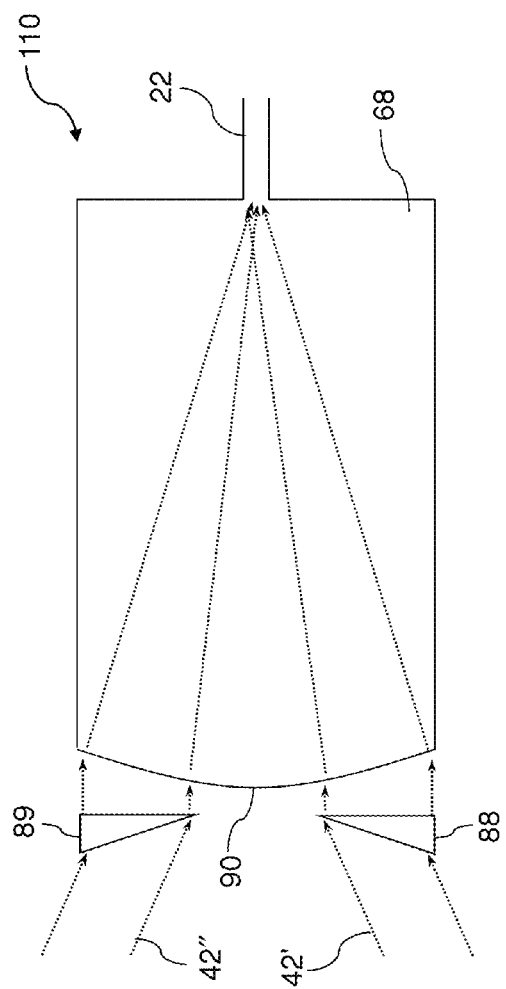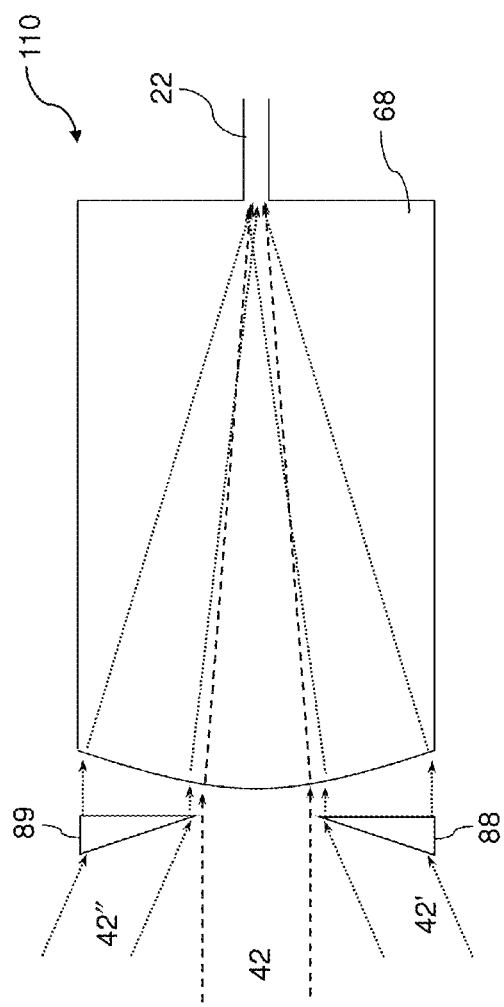

OPTICAL SYSTEMS FOR INFRARED TOUCH SCREENS

RELATED APPLICATIONS

The present application claims priority from U.S. provisional patent application No. 61/347,330, the contents of which are incorporated herein by reference.

FIELD OF THE INVENTION

The present invention relates to optical systems and in particular to the use of such optical systems in infrared touch screens. The invention has been developed primarily to improve the multi-touch capability of infrared touch screens and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Input devices based on touch sensing (referred to herein as touch screens irrespective of whether the input area coincides with a display screen, either in whole or in part) have long been used in electronic devices such as computers, personal digital assistants (PDAs), handheld games and point of sale kiosks, and are now appearing in other portable consumer electronics devices such as mobile phones. Generally, touch-enabled devices allow a user to interact with the device by touching one or more graphical elements, such as icons or keys of a virtual keyboard, presented on a display.

Several touch-sensing technologies are known, including resistive, surface capacitive, projected capacitive, surface acoustic wave, optical and infrared, all of which have advantages and disadvantages in areas such as cost, reliability, ease of viewing in bright light, ability to sense different types of touch object, e.g. finger, gloved finger, stylus, and single or multi-touch capability.

The various touch-sensing technologies known differ widely in their multi-touch capability, i.e. their performance when faced with two or more simultaneous touch events. Some early touch-sensing technologies such as resistive and surface capacitive are completely unsuited to detecting multiple touch events, reporting two simultaneous touch events as a 'phantom touch' halfway between the two actual points. Certain other touch-sensing technologies have good multi-touch capability but are disadvantageous in other respects. For example projected capacitive touch screens, discussed in US Patent Application Publication No 2006/0097991 A1, only sense certain touch objects (e.g. gloved fingers and non-conductive styluses are unsuitable) and use high refractive index transparent conductive films that are well known to reduce display viewability, particularly in bright sunlight. In another example video camera-based systems, discussed in US Patent Application Publication Nos 2006/0284874 A1 and 2008/0029691 A1, are extremely bulky and unsuitable for hand-held devices. Another touch technology with good multi-touch capability is 'in-cell' touch, where an array of sensors are integrated with the display pixels of a display (such as an LCD or OLED display). These sensors are usually photo-detectors (disclosed in U.S. Pat. No. 7,166,966 and US Patent Application Publication No 2006/0033016 A1 for example), but variations involving micro-switches (US 2006/0001651 A1) and variable capacitors (US 2008/0055267 A1), among others, are also known. In-cell approaches cannot be retro-fitted and generally add complexity to the manufacture and control of the displays in which the sensors are integrated. Furthermore those that rely on ambient light shadowing cannot function in low light conditions.

In yet another approach to touch sensing with several possible configurations, commonly known as 'infrared' touch, a touch event is detected and located by the shadowing of two intersecting light paths. In one well-known configuration, illustrated in FIG. 1 and described in U.S. Pat. Nos. 3,478,220 and 3,764,813, a touch screen 2 includes arrays of discrete light sources 12 (e.g. LEDs) along two adjacent sides of a rectangular input area 4 emitting two sets of parallel beams of light 16 towards opposing arrays of photo-detectors 14 along the other two sides of the input area. If a touch object 10 in the input area blocks a substantial portion of at least one beam in each of the two axes, its location can be readily determined.

In a variant infrared touch screen 17 that greatly reduces the optoelectronic component count, illustrated in FIG. 2 and described in U.S. Pat. No. 5,914,709, the arrays of light sources are replaced by arrays of 'transmit' optical waveguides 18 integrated on an L-shaped substrate 20 that distribute light from a single light source 12 (e.g. an LED or a vertical cavity surface emitting laser (VCSEL)) via a 1×N splitter 21 to produce a grid of light beams 16, and the arrays of photo-detectors are replaced by arrays of 'receive' optical waveguides 22 integrated on another L-shaped substrate 23 that collect the light beams and conduct them to a detector array 24 (e.g. a line camera or a digital camera chip). Each optical waveguide includes an in-plane lens 26 that collimates or focuses the signal light in the plane of the input area 4, and the device may also include cylindrically curved vertical collimating lenses (VCLs) 28 to collimate the signal light in the out-of-plane direction. As in the touch screen 2 of FIG. 1, a touch object is located from the beams blocked in each axis. For simplicity, FIG. 2 only shows four waveguides per side of the input area 4; in actual touch screens the in-plane lenses will be sufficiently closely spaced such that the smallest likely touch object will block a substantial portion of at least one beam in each axis. This type of infrared touch screen will be referred to hereinafter as an 'all-waveguide' touch screen.

In yet another variant infrared touch screen 30 shown in FIG. 3A (plan view) and disclosed in US Patent Application Publication No 2008/0278460 A1, entitled 'A transmissive body' and incorporated herein by reference, the 'transmit' waveguides 18 and their in-plane lenses 26 of the all-waveguide device shown in FIG. 2 are replaced by a transmissive body 32 comprising a planar transmissive element 34 and two collimation/redirection elements 36 that include parabolic turning mirrors 38. Infrared light 40 from a pair of optical sources 12 (e.g. LEDs or VCSELs) is launched into the transmissive element, then collimated and re-directed by the collimation/redirection elements to produce two sheets of light 42 that propagate in front of the transmissive element towards the receive waveguides 22. The light path through the transmissive element 34 and a collimation/redirection element 36 is shown in side view in FIG. 3B. Portions of the light sheets are collected by the in-plane lenses and guided to the detector array 24, and a touch object is detected and its location and dimensions determined from the obscured portions of the light sheets 42. Clearly the transmissive element 34 needs to be transparent to the infrared light 40 emitted by the optical sources 12, and it also needs to be transparent to visible light if there is an underlying display 43 (FIG. 3B). Alternatively, a display may be located between the transmissive element and the light sheets 42, in which case the transmissive element need not be transparent to visible light. This type of infrared touch screen will be referred to hereinafter as a 'periscopic retro-reflector' or 'PRR' touch screen.

A common feature of the infrared touch screens shown in FIGS. 1 to 3 is that the sensing light is provided in two fields containing parallel light paths, either as discrete beams (FIGS. 1 and 2) or as more or less uniform sheets of light (FIG. 3). The axes of the two light fields are usually perpendicular to each other and to the sides of the input area, although this is not essential (see for example U.S. Pat. No. 5,414,413). Despite the name 'infrared touch screens' it should be understood that the wavelength of the sensing light need not be in the infrared region, but could be in the visible for example.

Turning now to the issue of multi-touch capability, although infrared touch screens can detect the presence of multiple touch events, they are often unable to determine their locations unambiguously. In general, n simultaneous touch events will be detected as $n^2$ 'candidate points', of which $n(n-1)$ will be 'phantom points'. For the simplest multi-touch situation n=2 ('double touch'), the response of a FIG. 1 infrared touch screen 2 is illustrated in FIG. 4. The 'candidate points' include the two actual touch points 10 and two 'phantom points' 44 at the corners of a rectangle, and it can be difficult if not impossible to identify the correct pair without further information. It will be appreciated that the variant infrared touch screens of FIGS. 2 and 3 will also respond in the manner shown in FIG. 4. In some circumstances the correct pair can be identified via some form of extra information; for example as explained in U.S. Pat. No. 6,856,259, touch-down and lift-off timing, relative object sizes and expected touch locations can all be of use in resolving an ambiguity.

However even if the correct pair can be identified, say because one touch-down occurred before the other, further complications can arise if the detection system has to track moving touch objects. For example if two moving touch objects (FIG. 5A) on an infrared touch screen 2 move into an 'eclipse' state (FIG. 5B), the ambiguity between the actual points 10 and the phantom points 44 recurs when the objects move out of the eclipse state. FIGS. 5C and 5D illustrate two possible motions out of the eclipse state of FIG. 5B that, without further information, are indistinguishable to the touch screen controller.

OBJECT OF THE INVENTION

It is an object of the present invention to overcome or ameliorate at least one of the disadvantages of the prior art, or to provide a useful alternative. It is an object of the invention in a preferred form to provide infrared touch screens with improved multi-touch capability. It is another object of the invention in a preferred form to provide optical systems that improve the multi-touch capability of infrared touch screens.

SUMMARY OF THE INVENTION

According to a first aspect of the present invention there is provided an optical system comprising a focusing element and a redirection element, wherein said focusing element and said redirection element in combination are adapted to focus a first set of substantially collimated light paths propagating in a first direction onto a common focal point, and wherein said focusing element is adapted to focus a second set of substantially collimated light paths propagating in a second direction, different from said first direction, onto said common focal point.

Preferably, the optical system further comprises an optical waveguide having an end face proximate to the common focal point, such that the first and second sets of light paths are transmitted to and collected by the optical waveguide. More preferably, the optical system further comprises a slab waveguide for guiding the first and second sets of light paths in the plane of the slab waveguide towards the end face of the optical waveguide. The slab waveguide and the optical waveguide are preferably joined proximate to the common focal point. The first and second directions preferably lie in the plane of the slab waveguide.

In certain forms the focusing element comprises a refracting element formed by an edge of the slab waveguide. In other forms the focusing element comprises a refracting element formed within the slab waveguide. In yet other forms the focusing element comprises a reflecting element formed by an edge of the slab waveguide.

In certain forms the redirection element comprises a prism formed within the slab waveguide. In alternative forms the redirection element comprises a prism separate from the slab waveguide, such that the first set of light paths is redirected by the redirection element before being focused by the focusing element.

In certain forms the prism is adapted to redirect the first set of light paths by total internal reflection. In alternative forms the prism is adapted to redirect the first set of light paths by refraction.

Preferably, the slab waveguide, focusing element, optical waveguide and prism are formed together on a substrate.

In certain forms the optical system further comprises a second redirection element, wherein the focusing element and the second redirection element in combination are adapted to focus the second set of light paths onto the common focal point.

According to a second aspect of the present invention there is provided an optical system comprising a first focusing element and a second focusing element in unitary form, wherein said first focusing element is adapted to focus a first set of substantially collimated light paths propagating in a first direction onto a common focal point, and wherein said second focusing element is adapted to focus a second set of substantially collimated light paths propagating in a second direction, different from said first direction, onto said common focal point.

Preferably, the optical system further comprises an optical waveguide having an end face proximate to the common focal point, such that the first and second sets of light paths are transmitted to and collected by the optical waveguide. More preferably, the optical system further comprises a slab waveguide for guiding the first and second sets of light paths in the plane of the slab waveguide towards the end face of the optical waveguide. The slab waveguide and the optical waveguide are preferably joined proximate to the common focal point. Preferably, the first and second directions lie in the plane of the slab waveguide.

In certain forms the first and second focusing elements each comprise a refracting element formed by an edge of the slab waveguide. In other forms the first and second focusing elements each comprise a refracting element formed within the slab waveguide. In yet other forms the first and second focusing elements each comprise a reflecting element formed by an edge of the slab waveguide.

The slab waveguide, first focusing element, second focusing element and optical waveguide are preferably formed together on a substrate.

According to a third aspect of the invention there is provided a touch input device comprising:

a signal source for selectively generating a first set of substantially collimated light paths propagating across an input area of said touch input device in a first direction, or a second set of substantially collimated light paths propagating across said input area in a second direction, different from said first direction; and at least one optical system positioned to receive selected first light paths within said first set of substantially collimated light paths and selected second light paths within said second set of substantially collimated light paths, and adapted to focus said selected first light paths and said selected second light paths onto a common focal point.

In certain forms the optical system comprises a focusing element and a redirection element, wherein the focusing element and the redirection element in combination are adapted to focus the selected first light paths onto the common focal point, and wherein the focusing element is adapted to focus the selected second light paths onto the common focal point.

In alternative forms the optical system comprises a first focusing element and a second focusing element in unitary form, wherein the first focusing element is adapted to focus the selected first light paths onto the common focal point, and wherein the second focusing element is adapted to focus the selected second light paths onto the common focal point.

Preferably, the optical system further comprises an optical waveguide having an end face proximate to the common focal point, such that the selected first and second light paths are transmitted to and collected by the optical waveguide. More preferably, the optical system further comprises a slab waveguide for guiding the selected first and second light paths in the plane of the slab waveguide towards the end face of the optical waveguide. The slab waveguide and the optical waveguide are preferably joined proximate to the common focal point.

In preferred forms the first direction or the second direction is parallel to a side of the input area.

According to a fourth aspect the present invention provides a method of capturing at least a pair of collimated light signals propagating at an angle relative to each other, said method comprising receiving said light signals with an optical device having redirecting and focusing elements adapted to redirect and/or focus said light signals onto a common focal point.

Preferably the collimated light signals are generated from separate sources. Alternatively, the collimated light signals are generated from a source and an optical splitting element.

According to a fifth aspect the present invention provides a method of detecting a user input in a touch input device having at least one source, a touch input area and a detector, said method comprising: generating at least first and second light signals from said at least one source; passing said light signals over said input area at an angle relative to each other, and receiving said light signals with an optical device between said at least one source and said detector, said optical device having redirecting and/or focusing elements to redirect and/or focus said light signals onto a common focal point.

Preferably the light signals are generated from separate sources. Alternatively, the light signals are generated from a source and an optical splitting element. The light signals are preferably transmitted to the detector by way of an optical waveguide extending from the common focal point to the detector.

BRIEF DESCRIPTION OF THE DRAWINGS

Preferred embodiments of the invention will now be described, by way of example only, with reference to the accompanying drawings in which:

FIG. 3A illustrates a plan view of a 'periscopic retro-reflector' (PRR) style of infrared touch screen;

FIG. 3B illustrates in side view an optical path through selected components of the PRR touch screen shown in FIG. 3A;

FIGS. 5A to 5D illustrate plan views of the infrared touch screen of FIG. 1 showing recurrence of a double touch ambiguity with moving touch points;

FIG. 6 illustrates how a double touch ambiguity can be resolved by the provision of sensing light paths in a third direction ('skew' light paths);

FIG. 7 illustrates the production of skew light paths in a single axis PRR touch screen with an off-axis optical source;

FIGS. 11A, 11B and 11C show receive waveguide arrays capable of receiving both on-axis light paths and skew light paths;

FIGS. 12A and 12B illustrate the required performance of an optical system according to the present invention;

FIG. 13 shows how a simple lens fails to provide the required performance of an optical system according to the present invention;

FIGS. 14A and 14B illustrate in plan view and side view an optical system according to an embodiment of the present invention, with the 'skew' and 'on-axis' light paths propagating in the same plane;

FIGS. 18A and 18B illustrates in plan view and side view an optical system according to an embodiment of the present invention;

FIGS. 19 to 26 illustrate optical systems according to further embodiments of the present invention;

DETAILED DESCRIPTION OF PREFERRED EMBODIMENTS OF THE INVENTION

Figure 4:
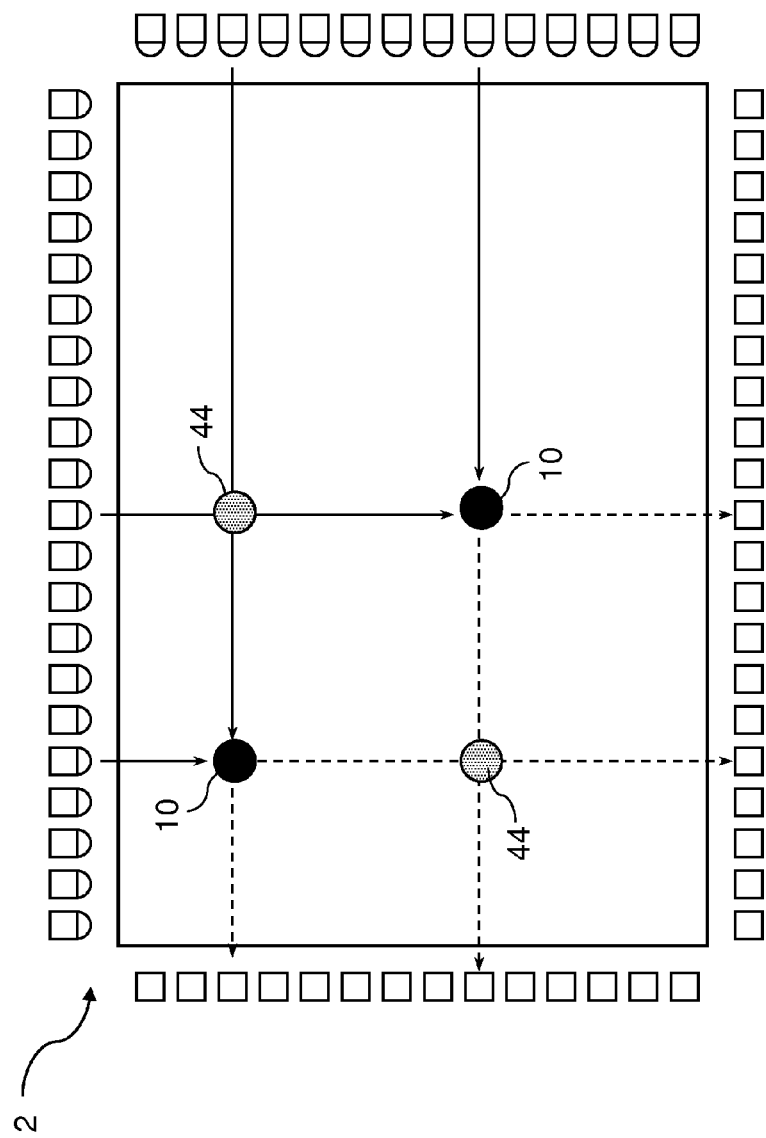
FIG. 4 illustrates a plan view of the infrared touch screen of FIG. 1 showing a double touch ambiguity.
Figure 5B:
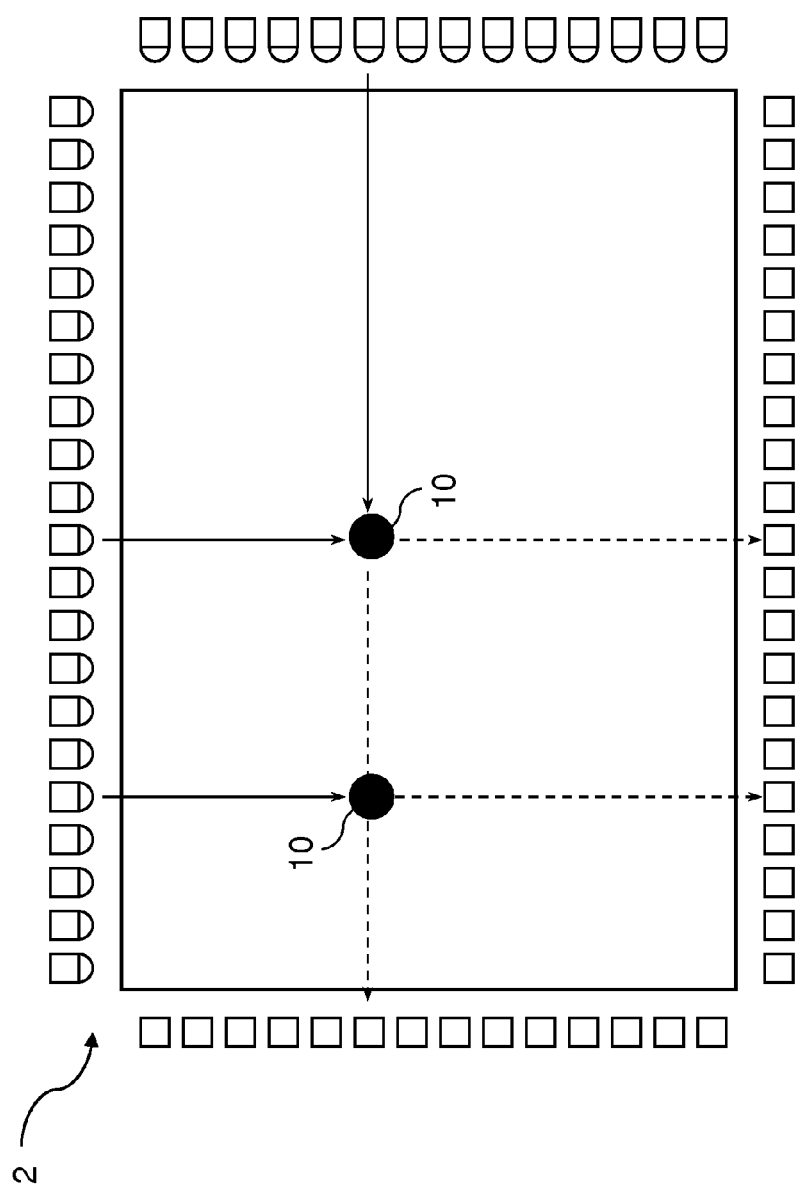
Figure 5D:
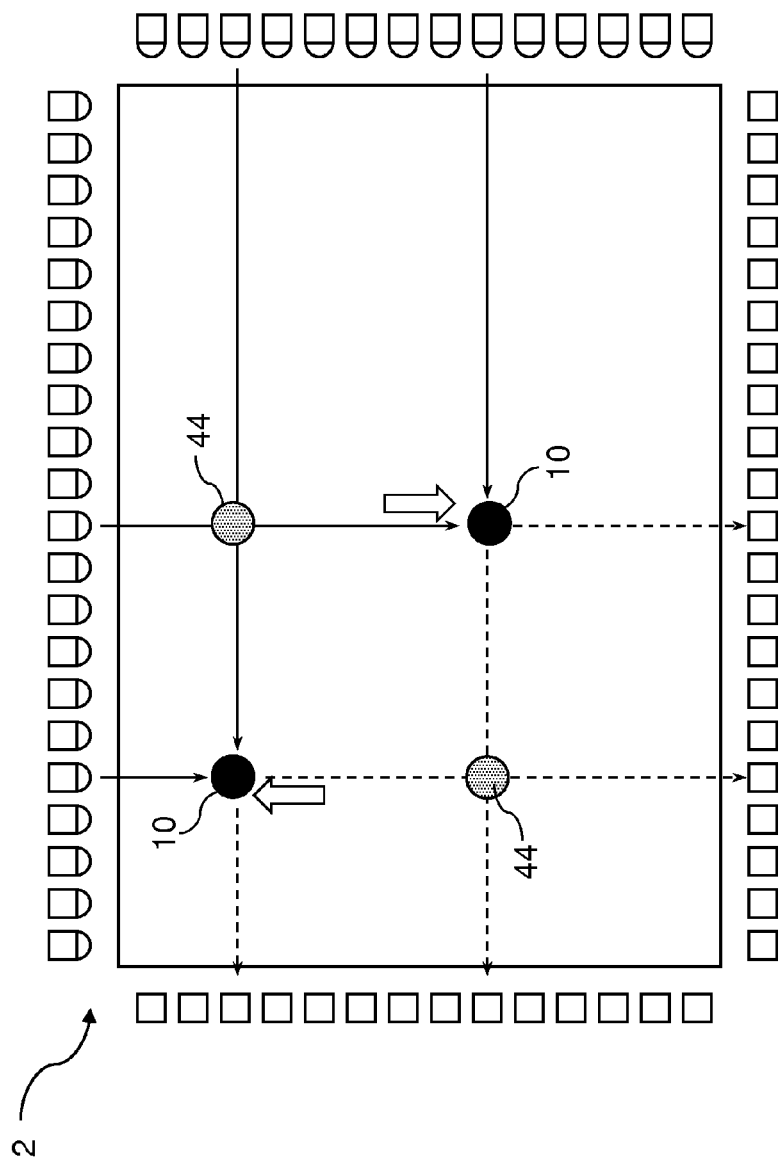

Referring to the drawings, FIG. 6 illustrates how the provision of sensing light paths in a third axis can resolve the double touch ambiguity in an infrared touch screen. In comparison with the situation shown in FIG. 4, it can be seen that when two touch objects 10 are simultaneously detected in the input area 4, the provision of skew light paths 46 enables the 'phantom' points 44 to be discounted, thereby resolving the double touch ambiguity. Three sets of light paths will always be able to determine the location of two touch objects unambiguously, and more generally, n+1 sets of light paths can determine the location of n touch objects unambiguously. Although a configuration with three sets of light paths as shown in FIG. 6 cannot always determine the location of three (or more) touch objects unambiguously, it can be shown that there are many instances in which it can do so, or at least eliminate several of the n(n−1) phantom points. In short, the multi-touch capability of infrared touch input devices is enhanced by the provision of the skew light paths.

Figure 8:
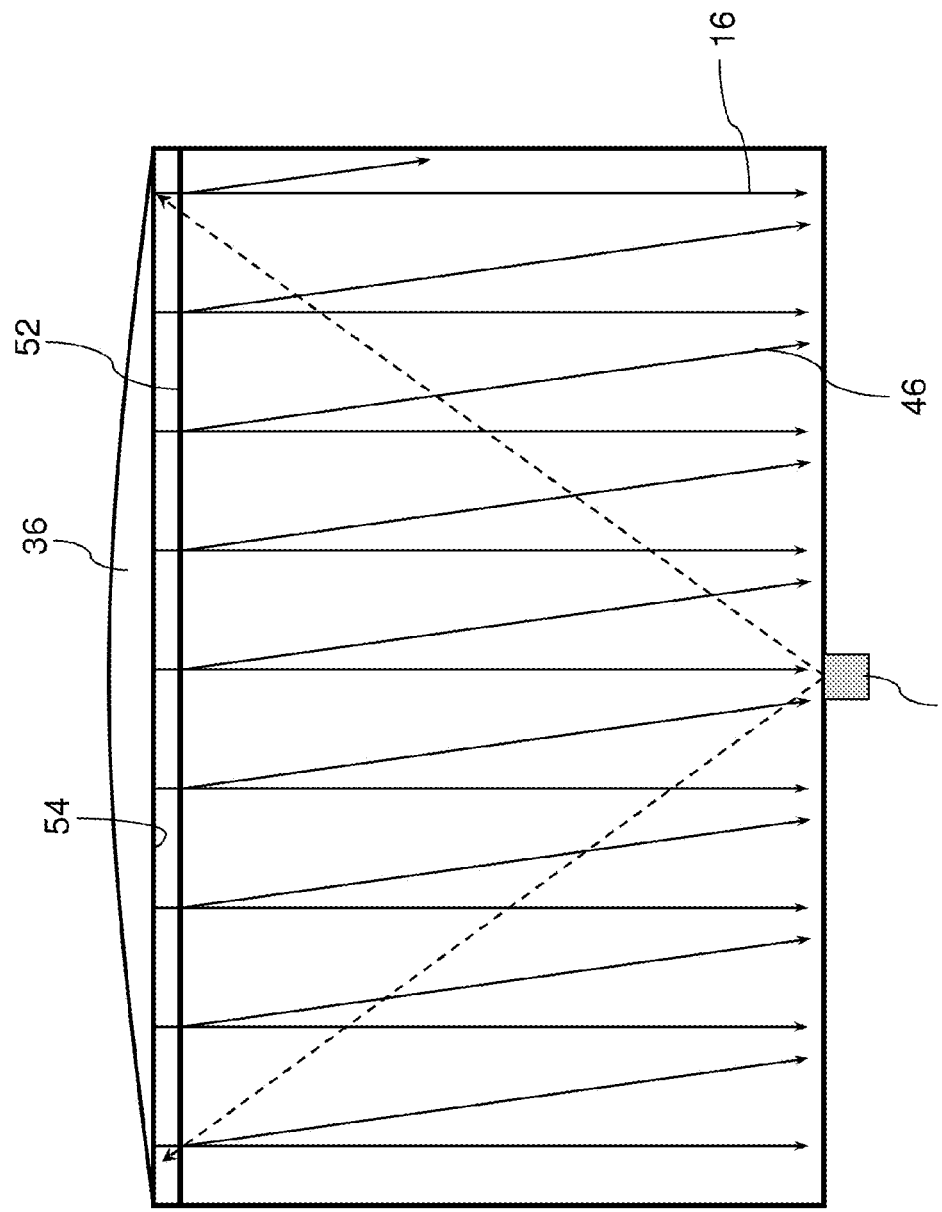
FIG. 8 illustrates the production of skew light paths in a single axis PRR touch screen with an optical splitting element.
Figure 9:
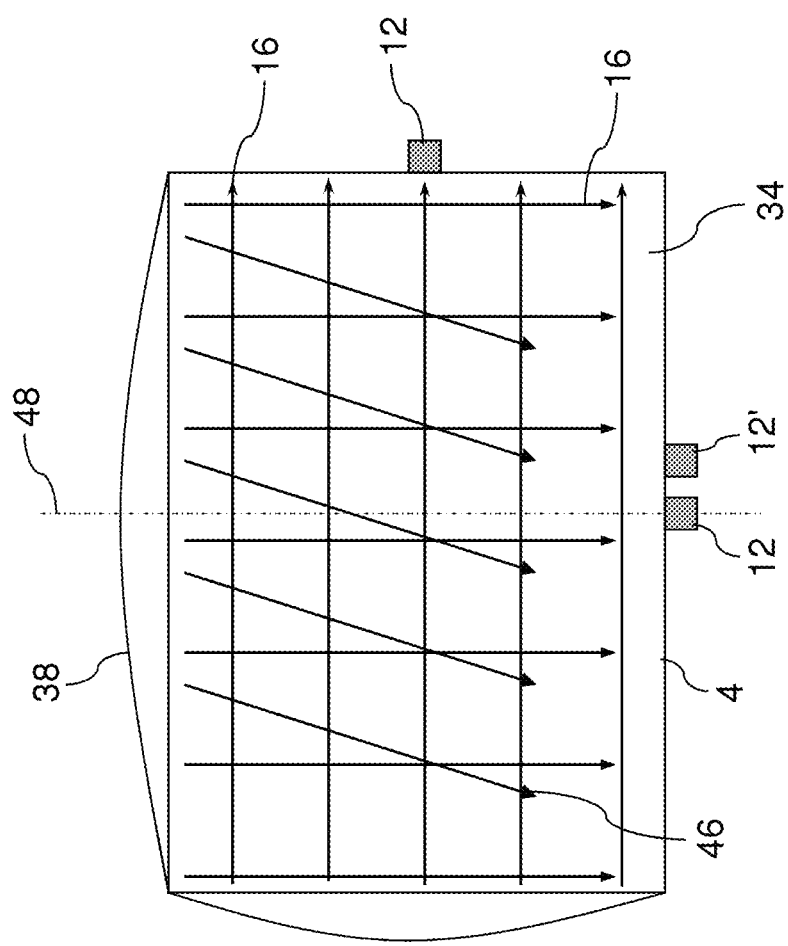
FIGS. 9 and 10 illustrate the production of skew light paths in one axis of a dual-axis PRR touch screen.
Figure 10:
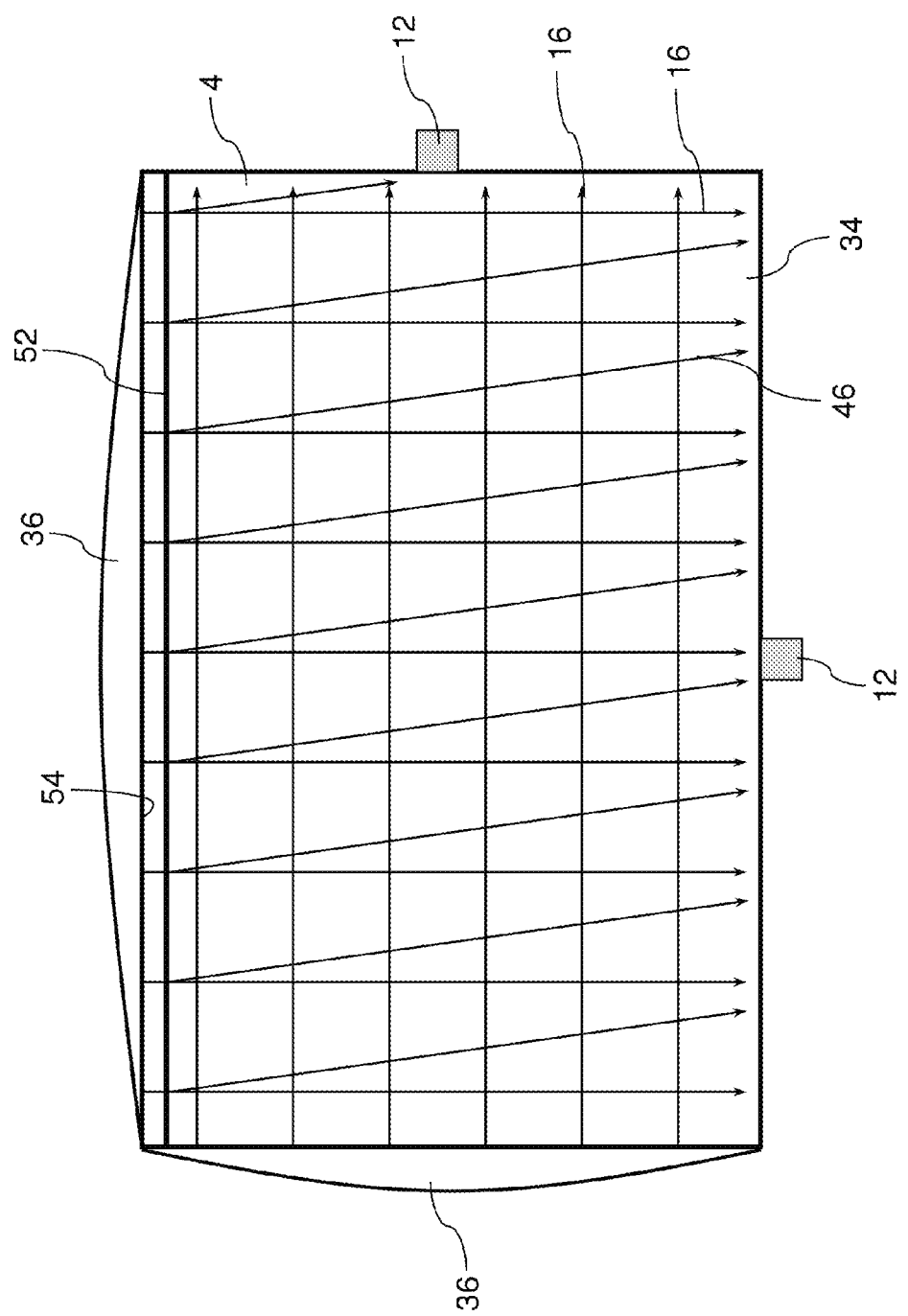

Referring to the PRR touch screen configuration 30 shown in FIG. 3, one means for generating a set of skew substantially collimated light paths is by introducing an off-axis optical source (e.g. an LED or a VCSEL). For a simplified single-axis PRR configuration, this situation is illustrated in FIG. 7, where an additional optical source 12' positioned away from the focal axis 48 of a parabolic turning mirror 38 generates a set of skew light paths 46 in addition to the 'straight' light paths 16 generated by the on-axis optical source 12. Referring to FIG. 8, a set of skew light paths 46 can also be generated with an optical splitting element such as a prism film 52 placed in front of the exit facet 54 of a collimation/redirection element 36. FIGS. 9 and 10 show dual axis PRR configurations where skew light paths 46 are generated in one axis only, either with an off-set optical source 12' (FIG. 9) or a prism film 52 (FIG. 10). Referring back to FIG. 6 it will be appreciated that this will be sufficient to resolve a double touch ambiguity in most circumstances. It would be straightforward to generate skew beams in the other axis with similar modifications, say to ensure skew beam coverage of the left and right hand edges of the input area 4, or to improve the ability of the system to deal with three or more simultaneous touch points. Note that the diverging light paths within the transmissive element 34 have been omitted from FIGS. 9 and 10 for clarity.

It will be appreciated that for the purposes of resolving a double touch ambiguity in an infrared touch screen, the same result can be achieved by providing at least one axis with two sets of skewed light paths rather than one skewed set 46 and one straight set 16 of light paths as shown in FIGS. 9 and 10. This could be achieved for example by providing two off-axis optical sources or by providing a differently structured prism film. The key point is that at least one axis is provided with two sets of substantially collimated light paths propagating in different directions. This specification will hereinafter concentrate on configurations with one skewed set 46 and one straight or on-axis set 16 of light paths, but the invention is not so limited.

Irrespective of how the skew light beams are generated, for a touch screen to make use of them it is necessary for the receive side optical system in at least one axis to be modified so as to detect both the skew light paths and the on-axis light paths.

For PRR infrared touch screens where the receive side optical system comprises waveguide arrays that collect portions of the signal light sheets and guide them to a detector array as shown in FIG. 3, one possibility is to modify the optical system by adding an extra waveguide array to receive the skew light paths. For example as shown in FIGS. 11A and 11B an extra waveguide array 56 can be provided on the same substrate 58 as the existing receive waveguides 22, with one or two multi-element detectors 24 as shown in FIGS. 11A and 11B respectively. These configurations may require numerous waveguide crossings, which are not problematic provided the crossing angle is large enough to prevent cross-talk. However a disadvantage with these configurations is the increased substrate width 59 (which translates directly to increased bezel width on a touch screen) resulting from the more complex waveguide layout. The bezel width increase can be avoided by fabricating the two waveguide arrays on separate substrates stacked on top of each other, but this adds complexity to the assembly.

An increase in bezel width can also be avoided by using a waveguide layout shown in FIG. 11C, with interleaved arrays of in-plane lenses 26A and 26B, adjacent pairs of which feed received signal light into common waveguides 22 at 2:1 Y junctions 60. However this layout has the disadvantage that 50% of the collected light is lost to radiation modes at the 2:1 Y junctions; this 3 dB loss is a result that will be well known to those skilled in the art of integrated optics.

The above disadvantages are avoided by the optical systems 61 of the present invention that, with reference to FIGS. 12A and 12B, collect light contained in two sets of substantially collimated light paths propagating in different directions and focus them to a common focal point 62 that may for example be a photo-detector or the entrance to an optical waveguide such as an integrated optical waveguide or an optical fibre. The substantially collimated light paths may for example be in the form of discrete beams 16 and 46 as shown in FIG. 12A or portions of two light sheets 42 and 42' as shown in FIG. 12B. We note that a simple lens is incapable of doing this; for example as shown in FIG. 13 a simple lens 64 can be positioned to focus one light beam 16 to the point 62, but not a second light beam 46 impinging on the lens from another direction.

FIGS. 14A and 14B show plan and side views of an optical system 65 according to one embodiment of the invention, in the form of a unitary in-plane lens 66 comprising a slab waveguide 68 with first and second focusing elements in the form of two curved refractive surfaces 70 and 72. The first, 'on-axis', refractive surface 70 is designed to focus light paths within an 'on-axis' or 'straight' sheet of substantially collimated light 42 into an optical waveguide 22 connected to the slab waveguide at a point proximate to the common focal point 62 of the two focusing elements, while the second, 'off-axis', refractive surface 72 is designed to do likewise for light paths within a skew sheet of substantially collimated light 42' propagating at an angle $\theta$ to the on-axis sheet of light. The slab waveguide 68 provides in-plane guidance towards the 'receive' waveguide 22.

An important aspect of the 'common focal point' optical system 65 shown in FIG. 14A is that both sets of light paths are collected and focused within the acceptance angle of the optical waveguide 22, avoiding the automatic 3 dB loss incurred by the layout shown in FIG. 11C. We note that 'straight' light paths impinging on the off-axis refractive surface 72 and 'skew' light paths impinging on the on-axis refractive surface 70 will not be focused into the optical waveguide 22 and are consequently lost to the optical system, but this also occurs with the waveguide layouts shown in FIGS. 11A, 11B and 11C.

In one specific design of an optical system 65 shown in FIG. 14A, for $\theta=10°$ and an operating wavelength around 850 nm, the slab waveguide 68 has a length 76 of 1.6 mm and a width 78 of 0.88 mm and is connected to a 10 μm wide optical waveguide 22 at the mid point of one end, with both the slab waveguide and the optical waveguide having a height 79 of 15 μm and a refractive index of 1.523. The 'off-axis' refractive surface 72 occupies a third of the width of the slab waveguide and has a radius of curvature of 0.615 mm, while the 'on-axis' refractive surface 70 occupies two thirds of the width of the slab waveguide and is aspheric with radius of curvature 0.5925 mm and parabolic constant K=−0.5. The side view illustrated in FIG. 14B also shows a waveguide substrate 91, a lower cladding layer 92 and a patterned upper cladding layer 94 that will usually be present. Closely spaced arrays of these unitary in-plane lenses and optical waveguides can be fabricated from photo-patternable polymers using methods described in U.S. Pat. No. 7,218,812 entitled 'Planar waveguide with patterned cladding and method for producing the same', the contents of which are incorporated herein by reference.

We note that it is not essential for the optical waveguide 22 to be connected to the slab waveguide 68; for example they could be separated by a gap filled with upper cladding material. However in the interests of minimising optical loss it is preferred that the optical waveguide and slab waveguide be connected.

Figure 14C:
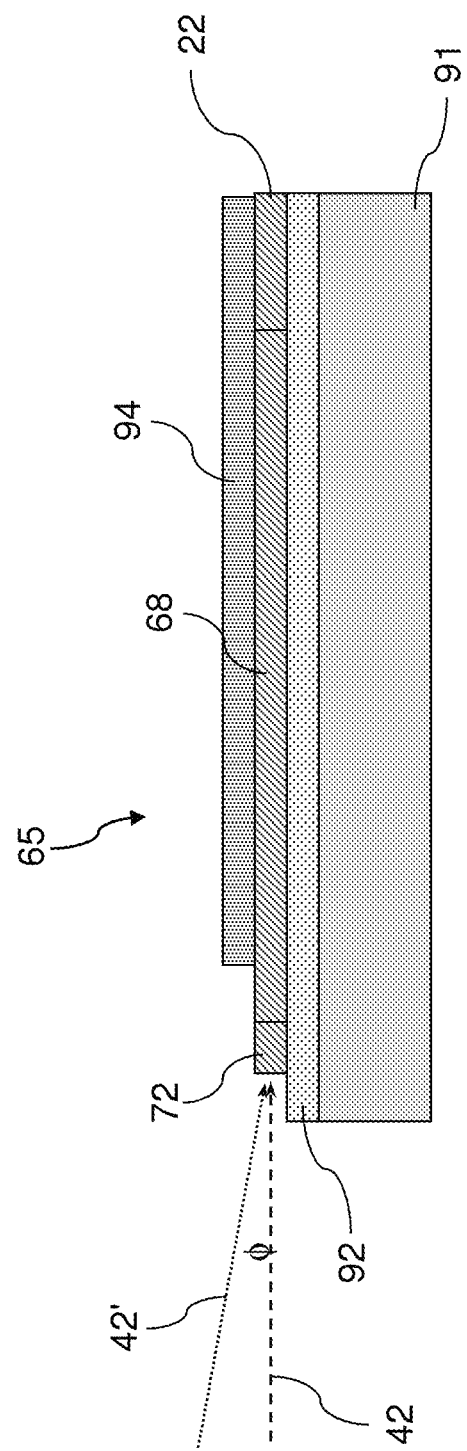
FIG. 14C is a view similar to that of 14B, but showing the 'skew' and 'on-axis' light paths propagating in non-parallel planes.

In FIG. 14B the 'on axis' light sheet 42 and the 'skew' light sheet 42' both propagate towards the optical system 65 in the plane of the slab waveguide 68, which will usually be the situation when the optical system is used in an infrared optical touch screen of the type shown in FIG. 3 for example. However as shown in FIG. 14C, these light sheets can propagate towards the optical system 65 in non-parallel planes, over a range of approach angles ϕ determined by the acceptance angle of the slab waveguide 68, which itself is largely determined by the refractive index differential between the slab waveguide and the lower and upper cladding layers 92, 94. The range of acceptance angles could be changed by appropriate angling of the input facet of one or both of the refractive surfaces 70, 72. We note that moulding-based methods may be more suitable for accurately fabricating optical structures with non-vertical refractive surfaces than methods based on photolithography or photo-patterning.

Figure 15:
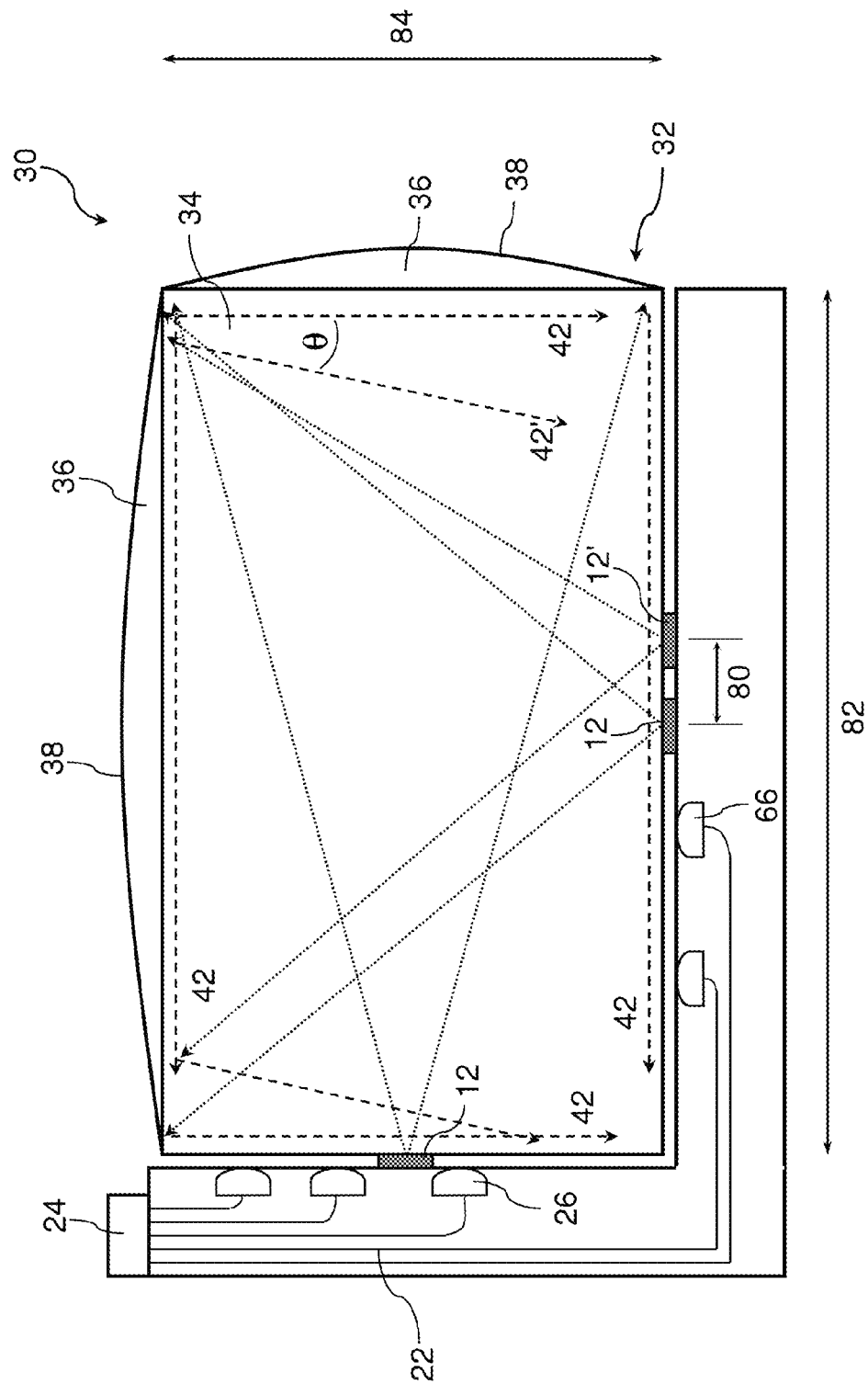
FIG. 15 illustrates in plan view a PRR touch screen incorporating a plurality of the optical systems of FIG. 14A, with skew light paths generated by an off-axis optical source.

FIG. 15 illustrates in plan view a PRR touch screen similar to that shown in FIG. 3, but with an additional optical source 12' displaced off-axis by a distance 80 and an array of optical systems in the form of unitary in-plane lenses 66 and associated receive waveguides 22 (shown in detail in FIG. 14A) along the long side 82 of the input area 4 for receiving portions of both the on-axis light sheet 42 from the on-axis source 12 and the skew light sheet 42' from the off-axis source 12' and conducting them to the detector array 24. The receive optics along the short side 84 have standard in-plane lenses 26. The offset 80 of the off-axis source determines the angle θ between the skew light sheet and the on-axis light sheet, and in one specific example design where the lengths of the long side 82 and short side 84 of the transmissive element 34 (essentially corresponding to the input area) are 160 mm and 100 mm respectively, an offset of 14 mm results in θ=10°. The offsets required to produce a range of skew beam angles for this size input area are given in Table 1.

TABLE 1

| Optical source offset/mm | Skew beam angle |
|---|---|
| 6.5 | 5° |
| 14 | 10° |
| 21 | 15° |
| 22.5 | 20° |

Figure 16B:
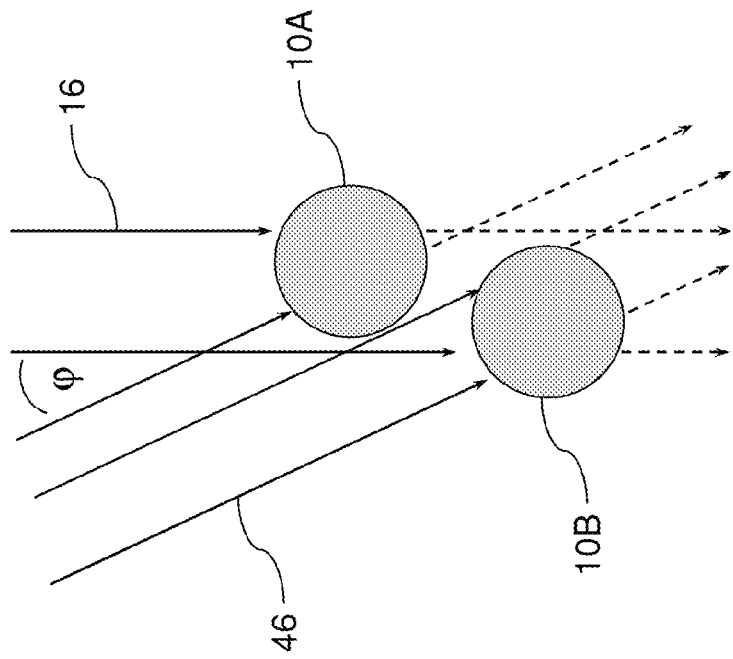
FIGS. 16A and 16B illustrate how the angle between sets of skew and on-axis light paths affects the ability to resolve a double touch ambiguity.
Figure 16A:
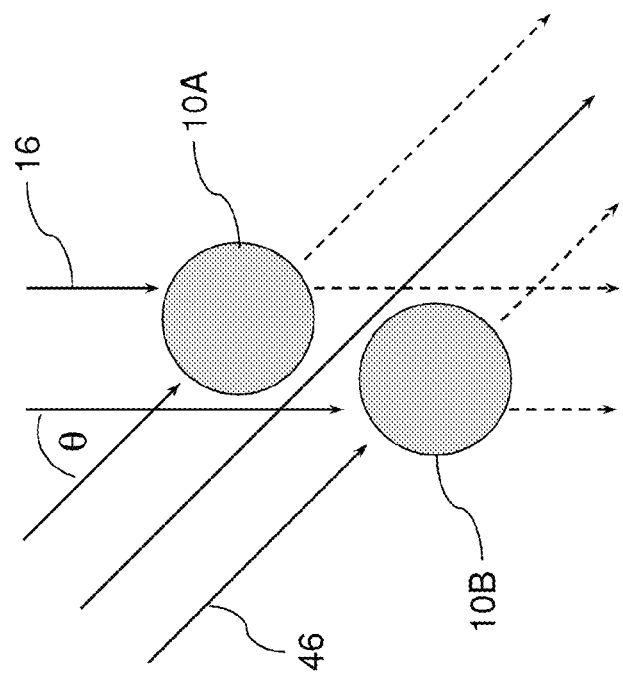

In general, a larger skew beam angle (up to 45°) is better for resolving a double touch ambiguity encountered by a Cartesian grid of sensing beams. For example in the particular double touch event shown in FIGS. 16A and 16B, the two touch objects 10A and 10B can be resolved with the larger angle θ between the on-axis light paths 16 and skew light paths 46 shown in FIG. 16A, but not with the smaller angle ϕ shown in FIG. 16B. However it will also be appreciated that if skew light paths are generated in one axis only as shown in FIGS. 9, 10 and 15, then a smaller beam angle results in more complete coverage of the input area with the skew beams. We have found that a skew beam angle of 10° is a reasonable compromise between these two factors, with the skew light paths propagating across the short axis of the input area for better screen coverage. Note that if greater skew beam coverage is required, skew light paths can be generated in both axes.

Referring back to FIG. 15, it will be appreciated that some pixels of the line camera 24 receive light from both an on-axis light sheet 42 and a skew light sheet 42', so there needs to be some way of distinguishing between the two; this is easily achieved by pulsing the on-axis and off-axis optical sources alternately. To conserve power, the off-axis source 12' is preferably only activated when required, e.g. when a double touch ambiguity arises that cannot be resolved by other means such as those mentioned above with reference to U.S. Pat. No. 6,856,259. Temporal discrimination is more difficult to achieve if the on-axis and skew light sheets are generated with an optical splitting element such as a prism film 52 as shown in FIG. 8. Although temporal discrimination could in principle be achieved by active switching (e.g. electro-optically or thermo-optically) of the optical splitting element, at the expense of increased complexity and drive power, it would in general be better to discriminate the skew and on-axis light paths spatially using an optical system comprising separate interleaved or stacked waveguide arrays as described above with reference to FIGS. 11A and 11B.

Referring back now to the unitary in-plane lens design shown in FIG. 14A, it will be appreciated that the presence of the off-axis refractive surface 72 reduces the amount of on-axis optical power that would be received if the on-axis refractive surface 70 extended across the full width of the slab waveguide 68. To minimise the reduction in system performance during normal operation, it is preferable for the off-axis refractive surface to be smaller in width, and to compensate for the lower received off-axis signal power by driving the off-axis source 12' harder, bearing in mind that it only needs to be activated if and when a double touch event occurs that cannot be resolved by other means. However the off-axis refractive surface cannot be made arbitrarily small because of diffraction effects. In the specific example where the off-axis refractive surface occupies a third of the width of the slab region (a 2:1 design), equivalent power densities in the on-axis and skew light sheets results in a received power ratio of approximately 3:1, while a 3:1 design results in a received power ratio of approximately 4:1. In certain embodiments the relative signal power from the first and second sources is controlled to provide a received power ratio of approximately 1:1.

Figure 17:
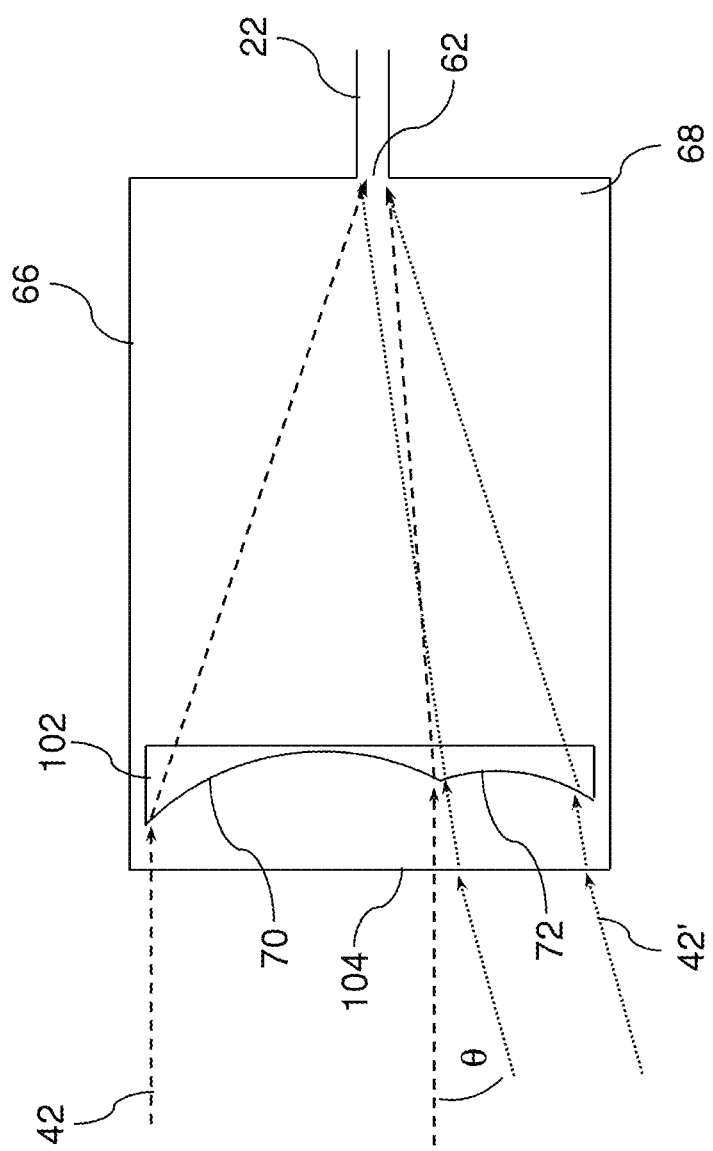
FIG. 17 illustrates in plan view an optical system according to an embodiment of the present invention.

FIG. 17 shows in plan view another unitary in-plane lens 66 comprising a slab waveguide 68 with an included 'air' lens 102 having first and second focusing elements 70, 72 that focus on-axis light 42 and skew light 42' respectively into a waveguide 22 attached to the slab waveguide proximate to the common focal point 62. We note that in this configuration the light paths within the 'skew' light sheet 42' are refracted at the slab waveguide end face 104 before they encounter the second focusing element 72. Slab waveguides with included air lenses can be fabricated from photo-patternable polymers as described in U.S. Pat. No. 7,546,009.

In other embodiments of the invention, a combination of a redirection element and a focusing element are used to focus light paths within two sheets of substantially collimated light to a common focal point. In one example, FIG. 18A shows in plan view an optical system 86 comprising a redirection element in the form of a prism 88 positioned in front of a focusing element in the form of a slab waveguide 68 with a refractive front surface 90, to redirect the light paths within the skew light sheet 42' so that the refractive surface can focus them into the optical waveguide 22. The prism can be conveniently photo-patterned at the same time as the in-plane lens and the waveguide; the side view illustrated in FIG. 18B also shows a waveguide substrate 91, a lower cladding layer 92 and a patterned upper cladding layer 94 that will usually be present. In the particular prism design shown in FIG. 18A the light paths within the skew light sheet enter and leave the prism at normal incidence and are redirected by total internal reflection off the facet 96. In this case the prism performance is temperature independent (because there is no refraction), potentially advantageous if the prism is composed of a polymer with a relatively high thermo-optic coefficient (dn/dT). A potential disadvantage is that the total internal reflection can be disrupted by condensation or other foreign matter on the facet 96, although for touch screen applications the expectation is that the optical system will be protected within the screen bezel. In an alternative prism design shown in FIG. 19 the light paths within the skew light sheet 42' are redirected by refraction at the front facet 98. A number of other prism designs will occur to those skilled in the art.

In another variation shown in FIG. 20 an 'air' prism 100 can be fabricated inside a slab waveguide 68 to redirect light paths within a 'skew' light sheet 42' to the optical waveguide 22, while in another variation shown in FIG. 21 an 'air' lens 102 can be fabricated with a redirection element 103 and a focusing element 90. In the FIG. 21 configuration the light paths within the 'skew' light sheet 42' are partially 'straightened up' or redirected by refraction at the slab waveguide end face 104 before they encounter the redirection element 103.

Figure 22:
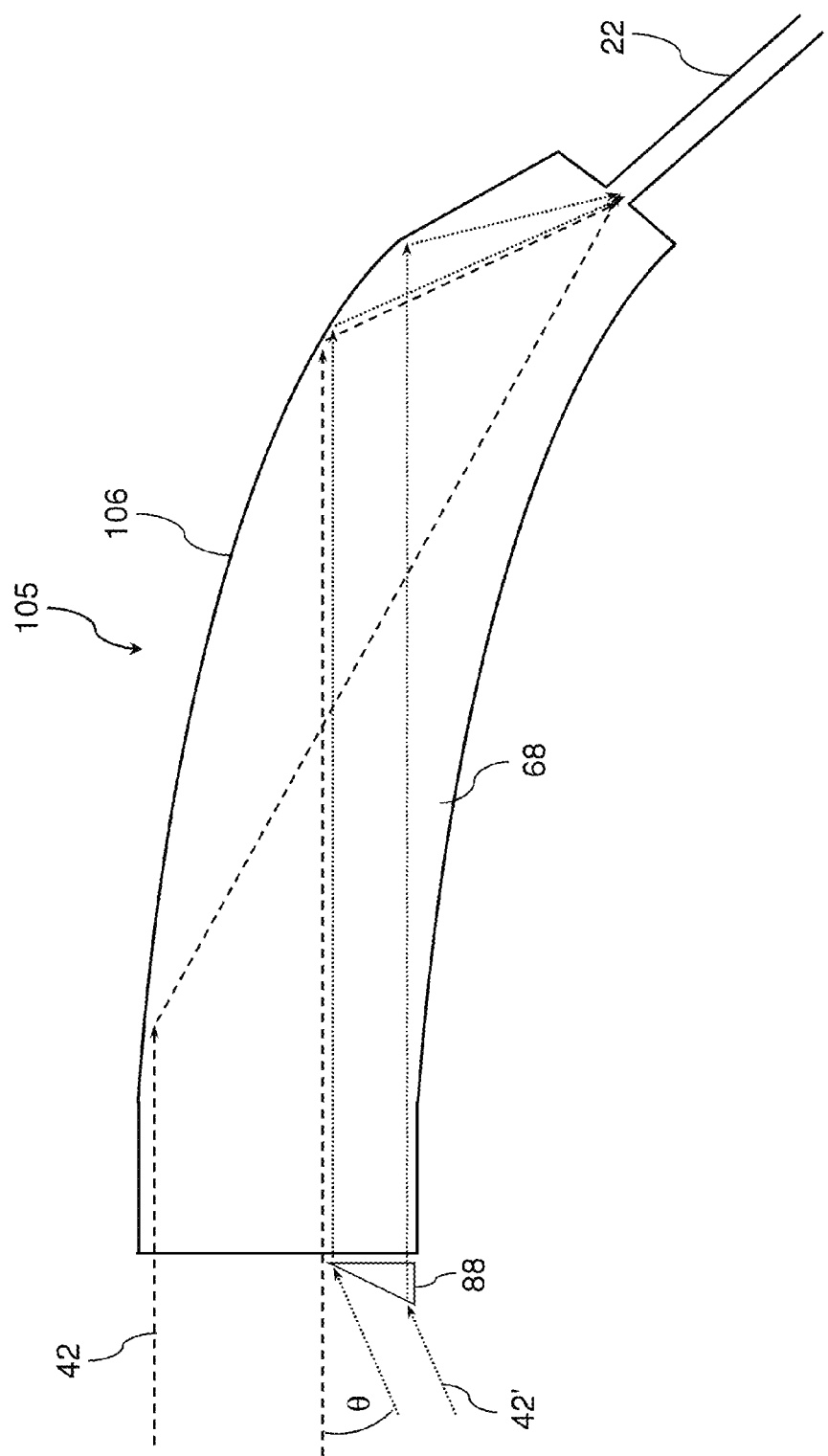
Figure 23:
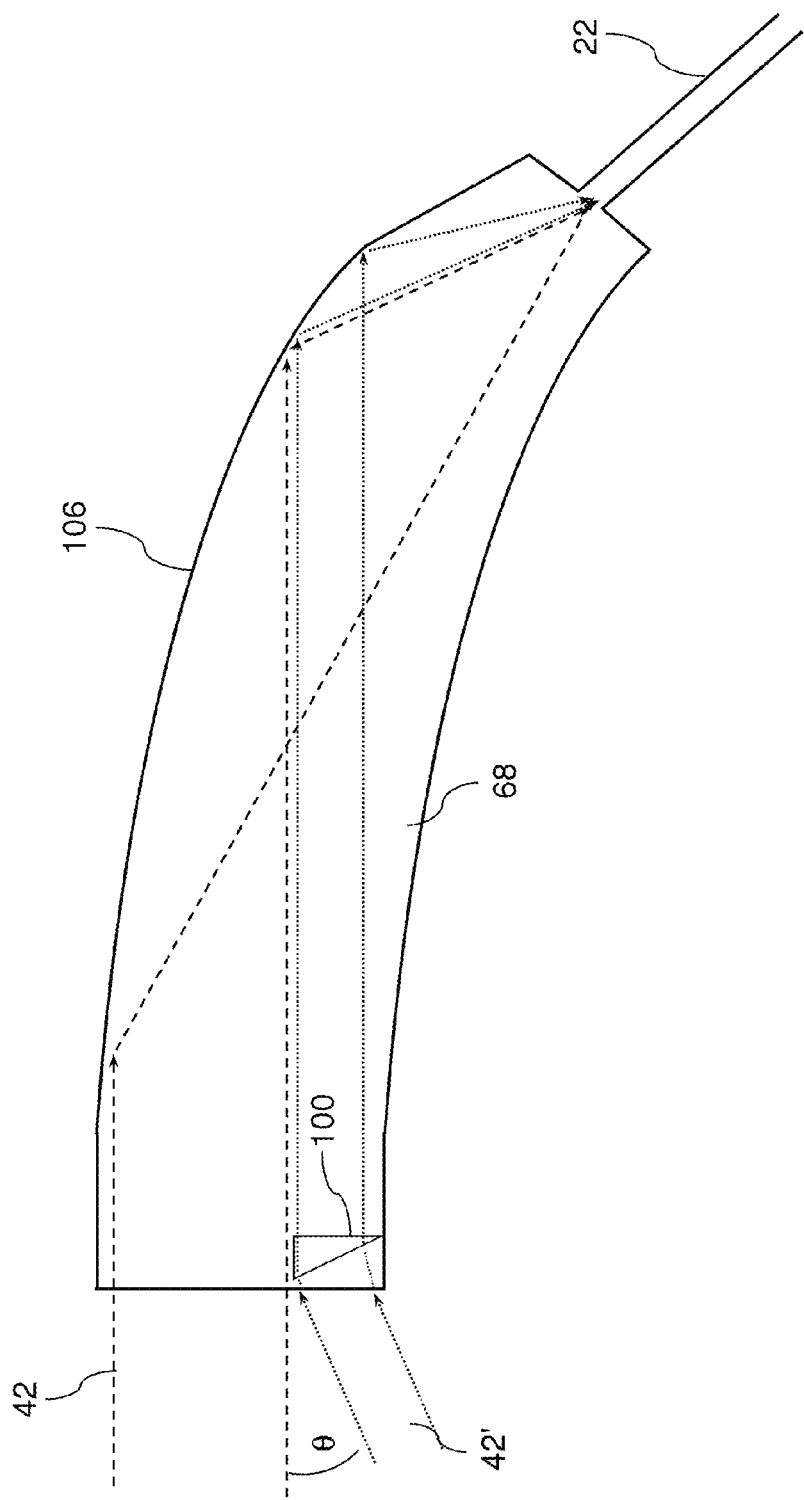
Figure 24:
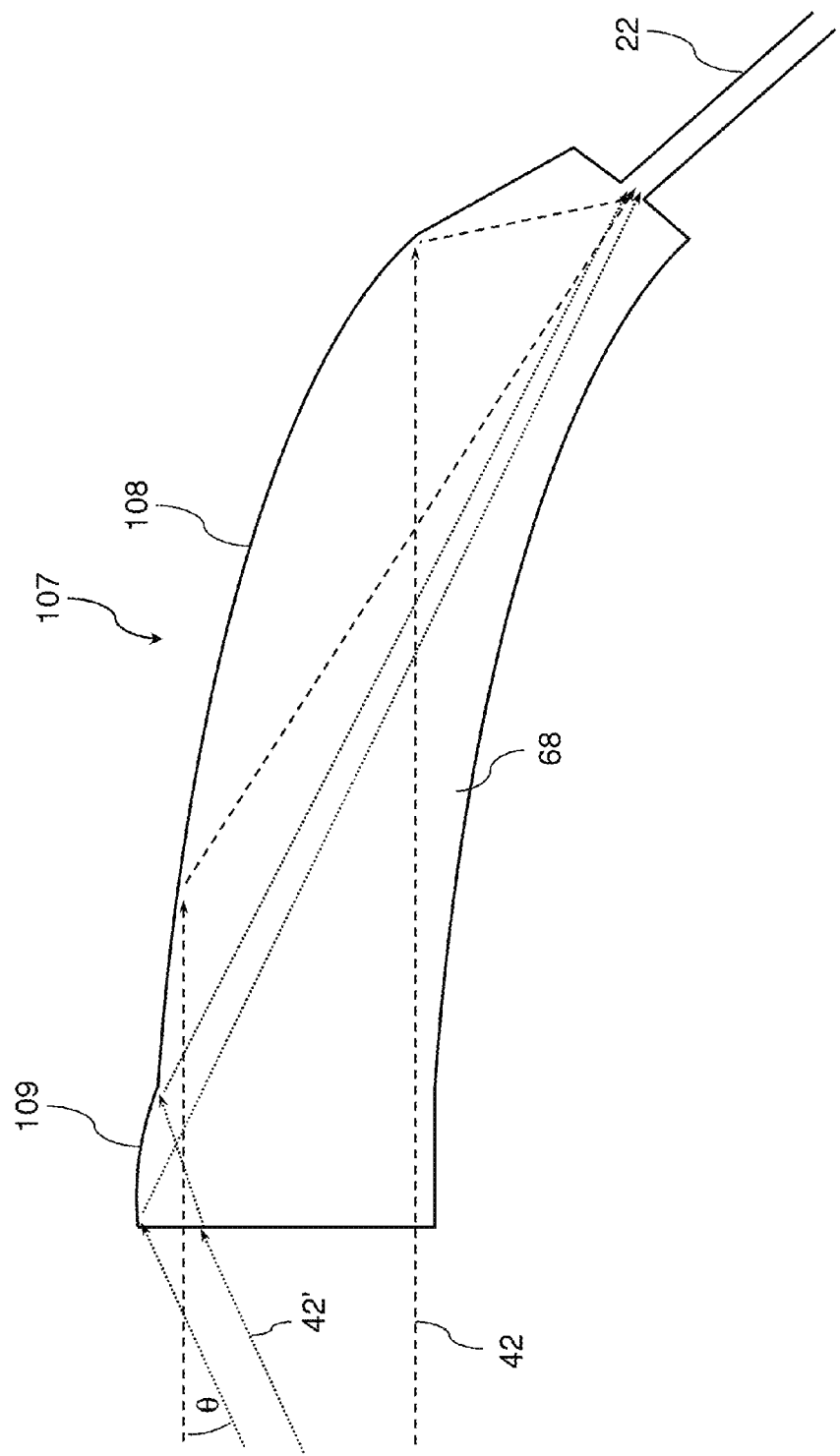

In yet other variations, light paths within the skew or on-axis light sheets can be focused by reflection rather than refraction, adapting designs described in U.S. Pat. No. 7,352,940. For example FIG. 22 shows in plan view an optical system 105 comprising a focusing element in the form of a parabolic side wall 106 of a slab waveguide 68 and a redirection element in the form of an external prism 88. Light paths within a skew light sheet 42' are redirected by the prism before being focused into an optical waveguide 22 by total internal reflection off the parabolic side wall 106, while light paths within an on-axis light sheet 42 are focused into the optical waveguide 22 by total internal reflection off the parabolic side wall 106. In a variation shown in FIG. 23, the redirection element is in the form of an internal 'air' prism 100 fabricated inside the slab waveguide 68. FIG. 24 shows in plan view a unitary optical system 107 comprising a first focusing element 108 and a second focusing element 109, each in the form of parabolic side wall portions of a slab waveguide 68, appropriately angled to focus light paths within an on-axis light sheet 42 and a skew light sheet 42' into an optical waveguide 22.

FIGS. 18A to 23 all show optical systems with a single redirection element and a single focusing element, where the redirection element is only required to redirect light paths within one of the two sheets of substantially collimated light. In other embodiments of the invention an optical system can also include a second redirection element to redirect light paths within the other sheet of substantially collimated light. Such an optical system may find application in touch screens with two skew light sheets. For example FIG. 25 shows in plan view an optical system 110 comprising two redirection elements in the form of two prisms 88 and 89 in front of a focusing element in the form of a slab waveguide 68 with a refractive front surface 90. One prism 88 and the refractive front surface in combination focus light paths within one skew light sheet 42' into an optical waveguide 22, while the other prism 89 and the refractive front surface in combination focus light paths within another skew light sheet 42" into the optical waveguide. As shown in FIG. 26, the optical system 110 could also accommodate light paths within an on-axis light sheet 42.

Figure 27:
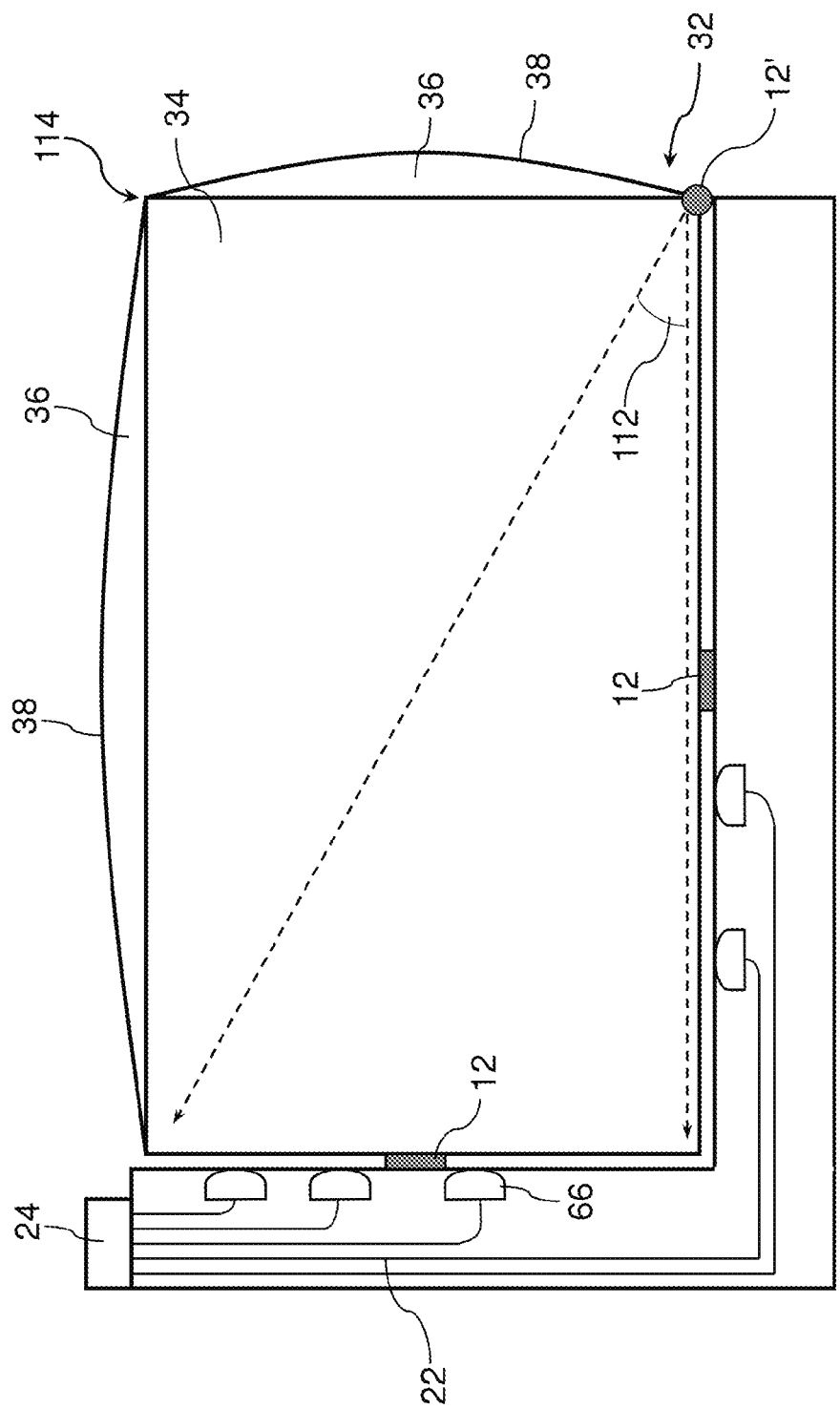
FIG. 27 illustrates in plan view a PRR touch screen incorporating the optical system of FIG. 14A, with skew light paths generated by an optical source in one corner.

FIG. 27 shows in plan view an alternative configuration of a PRR style of infrared touch screen where an additional optical source 12' is placed above one corner of the transmissive element 34 instead of off-axis as shown in FIG. 15. In this case the additional optical source is positioned to launch a fan of light 112 in front of the transmissive element 34, preferably co-planar with the on-axis light sheets (omitted for clarity) generated by the optical sources 12, towards an appropriately designed array of optical systems in the form of unitary in-plane lenses 66 as shown in detail in FIG. 14A. Alternatively the additional optical source could be located above the corner 114 to illuminate unitary in-plane lenses along one or both of the 'receive' sides of the input area. Each unitary in-plane lens only receives a small sector of the fan of light, small enough to be considered 'a set of substantially collimated light paths'. However it will be appreciated that each unitary in-plane lens needs to have an incrementally different design, which complicates the overall design and layout of the mask used to pattern the in-plane lenses and receive waveguides.

Figure 1:
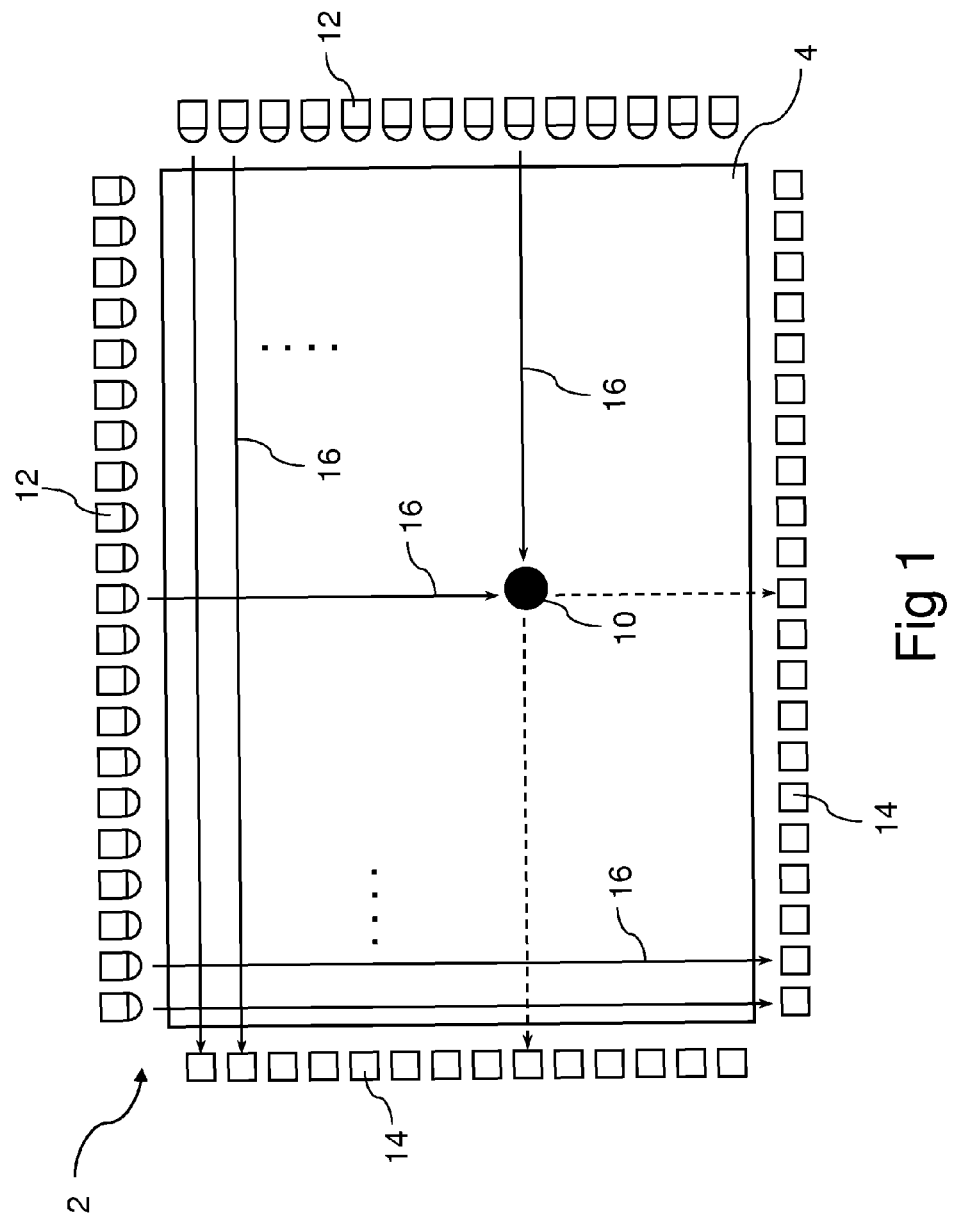
FIG. 1 illustrates a plan view of a conventional type of infrared touch screen showing detection of a touch object.
Figure 2:
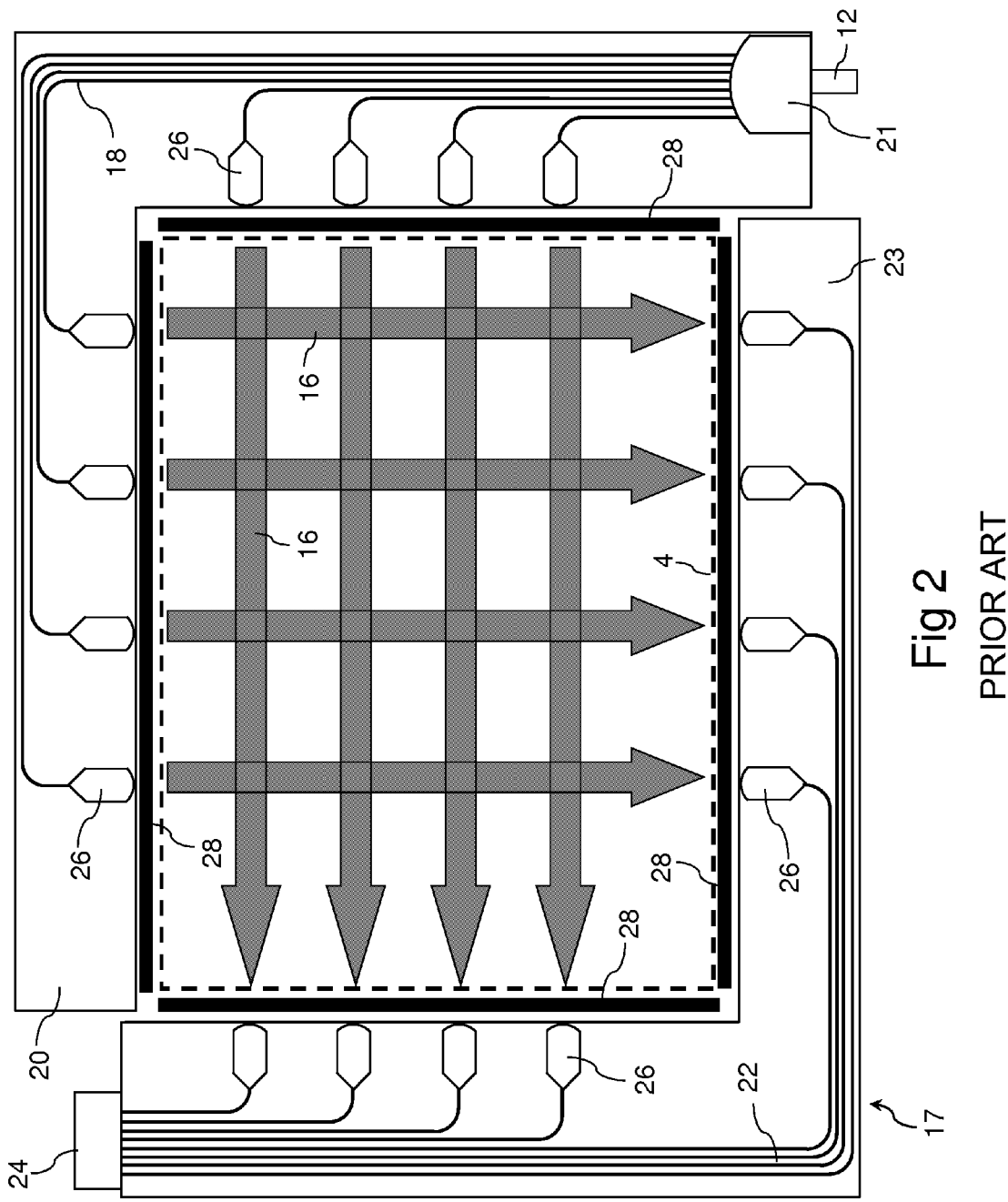
FIG. 2 illustrates a plan view of an 'all-waveguide' style of infrared touch screen.
Figure 28:
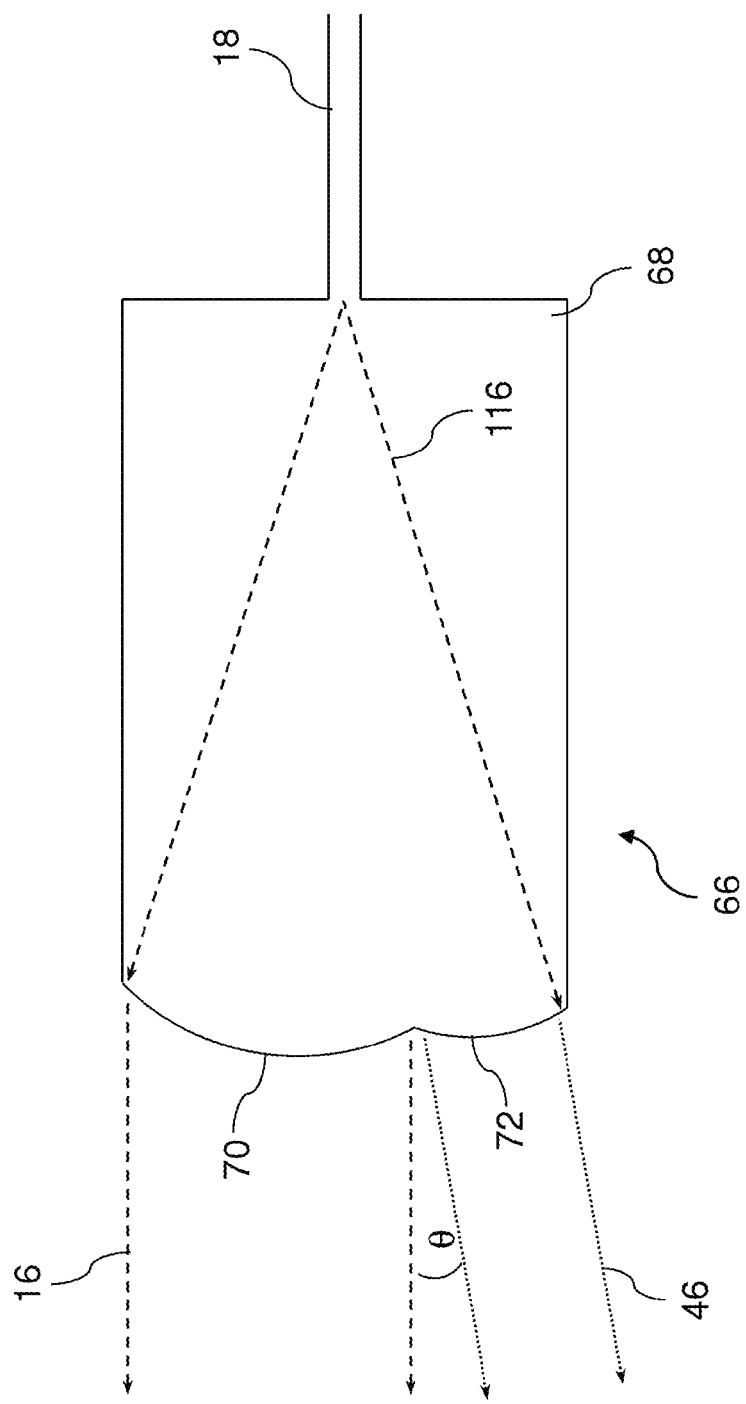
FIG. 28 illustrates how the optical system of FIG. 14A can be used to produce on-axis and skew light paths.

In all-waveguide infrared touch screens where the sensing light is launched across the input area from an array of 'transmit' waveguides 18 as shown in FIG. 2, it is possible to generate an additional set of skew beams by operating the unitary in-plane lens 66 shown in FIG. 14A (or any of the other optical systems illustrated in FIGS. 17 to 26) in the reverse direction. For example FIG. 28 shows signal light 116 from a 'transmit' waveguide 18 diffracting within a slab waveguide 68 before being collimated either by an on-axis refractive surface 70 to produce an on-axis set of substantially collimated light paths 16 or by an off-axis refractive surface 72 to produce a skew set of substantially collimated light paths 46. In combination with an appropriately angled set of receive waveguides, the skew light paths could be used to help resolve a double touch ambiguity.

Although the invention has been described with reference to specific examples, it will be appreciated by those skilled in the art that the invention may be embodied in many other forms.

We claim:

1. An optical system comprising:
    a first focusing element and a second focusing element in unitary form, where said first focusing element is adapted to focus a first set of substantially collimated light paths propagating in a first direction onto a common focal point, and where second focusing element is adapted to focus a second set of substantially collimated light paths propagating in a second direction, different from said first direction, onto said common focal point, and
    an optical waveguide having an end face proximate to said common focal point, such that said first and second sets of light paths are transmitted to and collected by said optical waveguide.

2. An optical system according to claim 1, further comprising:
    a slab waveguide for guiding said first and second sets of light paths in the plane of said slab waveguide towards said end face of said optical waveguide.

3. An optical system according to claim 2, wherein said slab waveguide and said optical waveguide are joined proximate to said common focal point.

4. An optical system according to claim 2, wherein said first and second directions lie in the plane of said slab waveguide.

5. An optical system according to claim 2, wherein said first and second focusing elements each comprise a refracting element formed by an edge of said slab waveguide.

* * * * *